US008934532B2

(12) United States Patent
Seely

(10) Patent No.: US 8,934,532 B2
(45) Date of Patent: Jan. 13, 2015

(54) SIMULTANEOUS RECEPTION OF MULTIPLE MODULATION SCHEMES

(71) Applicant: Itron, Inc., Liberty Lake, WA (US)

(72) Inventor: Danny Ray Seely, Spokane Valley, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 13/776,505

(22) Filed: Feb. 25, 2013

(65) Prior Publication Data

US 2014/0242931 A1    Aug. 28, 2014

(51) Int. Cl.
H04B 1/66      (2006.01)
H04B 15/00     (2006.01)
H03K 9/10      (2006.01)

(52) U.S. Cl.
CPC ...................................... *H04B 15/00* (2013.01)
USPC .......................................... 375/240; 375/324

(58) Field of Classification Search
USPC ................................................ 375/240, 324
See application file for complete search history.

(56) References Cited

U.S. PATENT DOCUMENTS

| | | | |
|---|---|---|---|
| 4,455,649 | A | 6/1984 | Esteban et al. |
| 5,377,227 | A | 12/1994 | Hurlbut et al. |
| 5,577,031 | A | 11/1996 | Smith |
| 5,809,422 | A | 9/1998 | Raleigh et al. |
| 5,832,249 | A | 11/1998 | Tran et al. |
| 5,920,589 | A | 7/1999 | Rouquette et al. |
| 6,253,060 | B1 | 6/2001 | Komara et al. |
| 6,282,184 | B1 | 8/2001 | Lehman et al. |
| 6,339,694 | B1 | 1/2002 | Komara et al. |
| 6,347,120 | B1 | 2/2002 | Sakoda |
| 6,445,685 | B1 | 9/2002 | Carrozza et al. |
| 6,526,532 | B1 | 2/2003 | Cinkler et al. |
| 6,535,502 | B1 | 3/2003 | Brink |

(Continued)

FOREIGN PATENT DOCUMENTS

| | | |
|---|---|---|
| CN | 102332942 | 1/2012 |
| EP | 2348649 | 7/2011 |

(Continued)

OTHER PUBLICATIONS

Office action for U.S. Appl. No. 13/776,476, mailed on Dec. 13, 2013, Seely, "Multichannel Radio Receiver with Overlapping Channel Filters", 10 pages.

(Continued)

*Primary Examiner* — Lee Nguyen
(74) *Attorney, Agent, or Firm* — Lee & Hayes, PLLC

(57) ABSTRACT

A multichannel radio receiver is configured to define at least two channel plans, each channel plan having at least one channel. The channel plans may differ due to channel bandwidths, channel locations, channel number and/or channel spacings. At least a portion of a radio spectrum may be common to at least two of the channel plans. At least two decoders may operate simultaneously to decode different modulation schemes on each of the at least two channel plans. In one example, two channel plans overlap portions of the radio spectrum. Two different and complementary modulation schemes are used on the two channel plans, respectively. The complementary modulation schemes reject signals associated with the other. Accordingly, portions of the radio spectrum are used simultaneously by at least two channel plans and at least two modulation schemes, respectively.

20 Claims, 23 Drawing Sheets

(56) References Cited

U.S. PATENT DOCUMENTS

| | | |
|---|---|---|
| 6,798,850 B1 | 9/2004 | Wedin et al. |
| 6,830,523 B1 | 12/2004 | Kuhn |
| 6,910,979 B2 | 6/2005 | Barrie et al. |
| 6,935,976 B1 | 8/2005 | Grace, Jr. et al. |
| 6,947,500 B1 | 9/2005 | Carrozza et al. |
| 6,985,545 B2 | 1/2006 | Teo et al. |
| 7,430,254 B1 | 9/2008 | Anderson |
| 7,466,743 B2 | 12/2008 | Naguib |
| 7,483,483 B2 * | 1/2009 | Lakkis .................. 375/238 |
| 7,548,579 B1 | 6/2009 | Murphy et al. |
| 7,713,151 B2 | 5/2010 | Fulton |
| 7,912,028 B2 | 3/2011 | Arviv et al. |
| 7,936,851 B2 | 5/2011 | Renfors et al. |
| 7,986,711 B2 | 7/2011 | Horvath et al. |
| 8,045,654 B1 | 10/2011 | Anderson |
| 8,128,521 B1 | 3/2012 | Ulmer |
| 8,197,367 B2 | 6/2012 | Pulkrabek et al. |
| 2002/0090915 A1 | 7/2002 | Komara et al. |
| 2002/0106009 A1 | 8/2002 | Harrison |
| 2002/0118784 A1 | 8/2002 | Teo et al. |
| 2003/0060204 A1 | 3/2003 | Francl et al. |
| 2003/0076899 A1 | 4/2003 | Kumar et al. |
| 2004/0032825 A1 | 2/2004 | Halford et al. |
| 2004/0246994 A1 | 12/2004 | Munoz et al. |
| 2005/0156775 A1 | 7/2005 | Petre et al. |
| 2005/0201450 A1 | 9/2005 | Volpi et al. |
| 2005/0259724 A1 | 11/2005 | Bergstrom et al. |
| 2005/0259755 A1 | 11/2005 | Tomasin et al. |
| 2005/0281321 A1 | 12/2005 | Bergstrom et al. |
| 2005/0289623 A1 | 12/2005 | Midani et al. |
| 2007/0067376 A1 | 3/2007 | Noga |
| 2007/0069864 A1 | 3/2007 | Bae et al. |
| 2007/0097942 A1 | 5/2007 | Gorokhov et al. |
| 2009/0247179 A1 | 10/2009 | Bell et al. |
| 2010/0142723 A1 | 6/2010 | Bucklen |
| 2010/0328527 A1 | 12/2010 | Brandsma et al. |
| 2011/0090059 A1 | 4/2011 | Sadr |
| 2011/0255577 A1 | 10/2011 | Agee et al. |
| 2012/0063554 A1 | 3/2012 | Smith |
| 2012/0163508 A1 * | 6/2012 | Kuffner et al. .................. 375/340 |
| 2012/0165142 A1 | 6/2012 | Grace |
| 2012/0189084 A1 | 7/2012 | Yu |
| 2012/0213514 A1 | 8/2012 | Yu |
| 2012/0294397 A1 | 11/2012 | Umeda et al. |
| 2013/0004180 A1 | 1/2013 | Gupta et al. |
| 2013/0030931 A1 | 1/2013 | Moshfeghi |
| 2013/0201406 A1 | 8/2013 | Ling et al. |
| 2013/0266083 A1 | 10/2013 | Baik et al. |
| 2013/0272453 A1 | 10/2013 | Gupta |
| 2014/0101354 A1 | 4/2014 | Liu et al. |

FOREIGN PATENT DOCUMENTS

| | | |
|---|---|---|
| WO | WO9528041 | 10/1995 |
| WO | WO2009055770 | 4/2009 |
| WO | WO2010053967 | 5/2010 |

OTHER PUBLICATIONS

Office action for U.S. Appl. No. 13/776,562, mailed on Apr. 24, 2014, Seely et al., "Radio to Support Channel Plans of Arbitrary Width and/or Spacing", 9 pages.

Office action for U.S. Appl. No. 13/776,476, mailed on Apr. 25, 2014, Seely, "Multichannel Radio Receiver with Overlapping Channel Filters", 8 pages.

Office action for U.S. Appl. No. 13/776,587, mailed on May 6, 2014, Seely, "FSK/MSK Decoder", 6 pages.

PCT Notice re Invitation to Pay Additional Fees mailed Jun. 16, 2014 for PCT Application No. PCT/US14/18436, 8 Pages.

PCT Notice re Invitation to Pay Additional Fees mailed Jun. 16, 2014 for PCT Application No. PCT/US14/18408, 6 Pages.

PCT Search Report and Written Opinion mailed Jun. 16, 2014 for PCT Application No. PCT/US14/18440, 10 Pages.

PCT Search Report and Written Opinion mailed Jun. 16, 2014 for PCT Application No. PCT/US14/18429, 9 Pages.

PCT Search Report and Written Opinion mailed Jun. 16, 2014 for PCT Application No. PCT/US14/18413, 11 Pages.

PCT Search Report and Written Opinion mailed Jun. 16, 2014 for PCT Application No. PCT/US14/18433, 14 Pages.

PCT Search Report and Written Opinion mailed Jun. 16, 2014 for PCT Application No. PCT/US14/18423, 13 Pages.

Savir, "MSc Thesis: Scalable and Reconfigurable Digital Front-End for SDR Wideband Channelizer", retrieved on Feb. 27, 2012 at <<http://ce.et.tudelft.nl/publicationfiles/1206_716_Gil_Savir-MSc_thesis.pdf>>, Delft, NL, Sep. 1, 2011, pp. 1, 5, 9, & 10.

* cited by examiner

SIMULTANEOUS RECEPTION OF MULTIPLE MODULATION SCHEMES

RELATED APPLICATIONS

This application is related to and claims priority to the following U.S. patent applications: U.S. patent application Ser. No. 13/776,587, titled "FSK/MSK Decoder", filed on Feb. 25, 2013; U.S. patent application Ser. No. 13/776,562, titled "Radio to Support Channel Plans of Arbitrary Width and/or Spacing", filed on Feb. 25, 2013; U.S. patent application Ser. No. 13/776,476, titled "Multichannel Radio Receiver with Overlapping Filters", filed on Feb. 25, 2013; U.S. patent application Ser. No. 13/776,528, titled "Real-Time Spectrum-Assessment Engine", filed on Feb. 25, 2013; U.S. patent application Ser. No. 13/776,548, titled "Radio with Analog-to-Digital Sample Rate Decoupled from Digital Subsystem", filed on Feb. 25, 2013; and U.S. patent application Ser. No. 13/776,575, titled "Radio to Detect and Compensate for Frequency Misalignment", filed on Feb. 25, 2013, all of which are commonly assigned herewith, and hereby incorporated by reference.

BACKGROUND

Radio frequency (RF) spectra may be used in one- and two-way communication between devices, and may involve the transmission of packets containing digital information. An increase in the number of devices communicating over certain radio bands and the need to transmit more information has resulted in considerable noise and interference. This is particularly burdensome when using low-power devices and/or devices utilizing unregulated areas within the spectrum.

In response, different channel plans, filters and modulation schemes have been developed to provide better results. However, these developments fail to adequately provide for the need to transmit increasingly larger volumes of information and to work within increasingly crowded and noisy RF environments.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
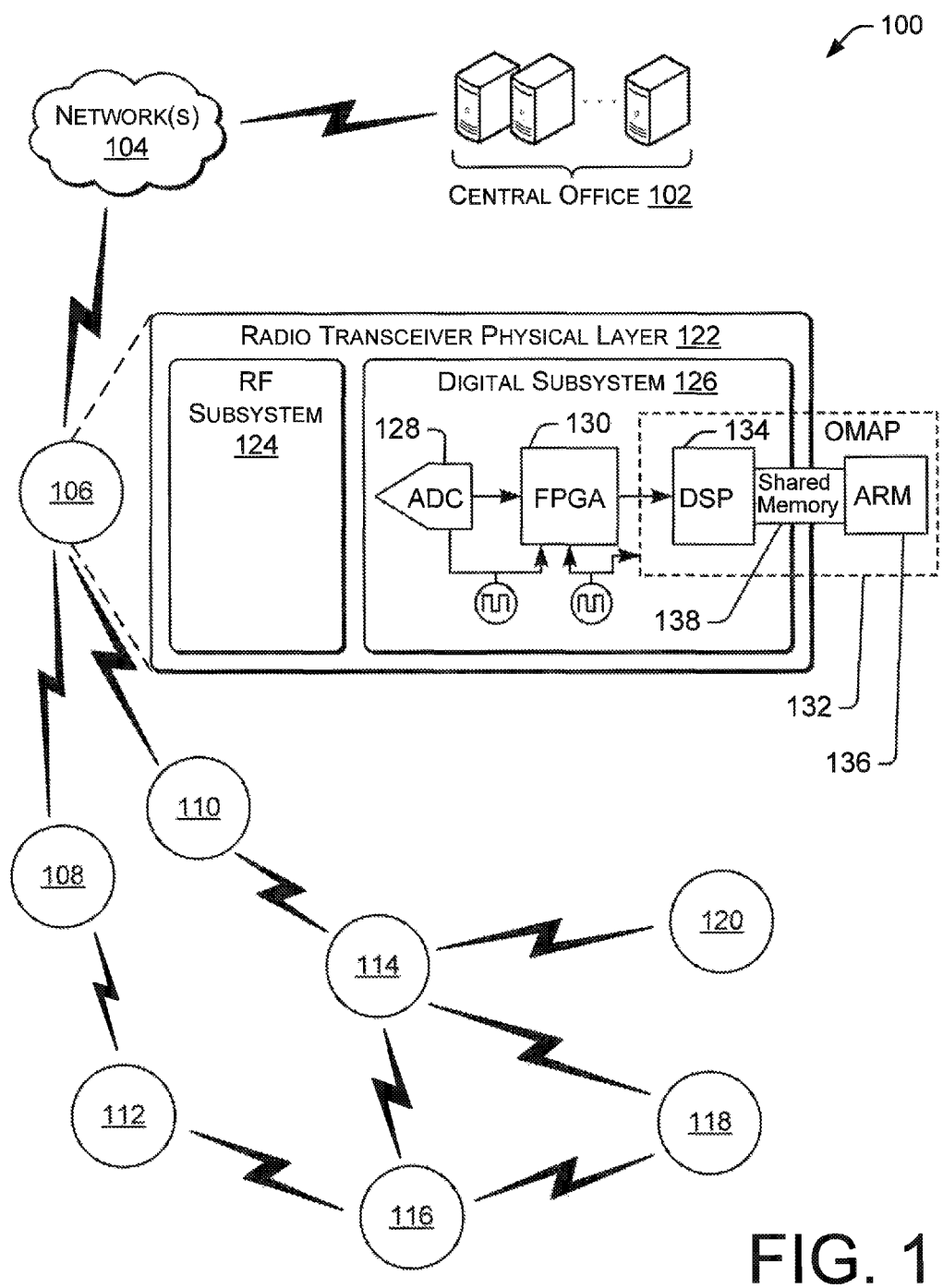
FIG. 1 is high level block diagram of a networked environment, showing an example radio having both RF and digital subsystems.

The disclosure describes techniques of radio functionality and operation. In one example, a radio having some or all of the described techniques may be used in conjunction with a data collector or data concentrator in a networked utility metering environment. In an automatic meter reading (AMR) and/or advanced metering infrastructure (AMI) environment, a plurality of low cost "endpoints" are configured within a radio frequency (RF) network. Each endpoint may form a node in the network, and may be associated with a utility meter (electric, gas, water, etc.) or other network device (switch, sensor, transformer, etc.). The endpoints may be inexpensively constructed, and may operate using low power and/or with poor control over frequency of transmission and/or reception. Accordingly, the radio in the data collector/concentrator encounters challenges when communicating with the endpoints.

A first example of the techniques may include an RF subsystem (e.g., an analog RF front end) and a digital subsystem. The digital subsystem may be configured in a field programmable gate array (FPGA), an application specific integrated circuit (ASIC), a digital signal processor (DSP) and/or other logic device. The digital subsystem may provide multichannel functionality for both reception and transmission. The digital subsystem may be configured to use an analog to digital converter (ADC) to sample input. A channelizer bank within the digital subsystem may include a plurality of channelizers and may be extensible. Each channelizer may receive and translate input into a plurality of channels. The channels, produced by one or more channelizers, may have bandwidths that are non-uniform and/or spacing (e.g., spacing center-to-center of adjacent channels) that is irregular. The translation may include re-sampling channels at a rate associated with a modulation scheme. A decoder bank may include a plurality of decoders operating in parallel, and may be extensible. Each decoder may receive input from one or more channelizers and is associated with a particular modulation scheme. The radio may support a virtually unlimited number of modulation schemes, from primitive schemes (GFSK, GMSK, OOK, etc.) to advanced modulation schemes, limited only by factors such as size of logic device. Moreover, many modulation schemes operated at different baud rates may be considered to be different modulation schemes. The radio may be configured to simultaneously receive data using any of the installed modulation decoders on any of the channels. The radio may support a broad range of baud rates, e.g., allowing for parallel operation of narrow-band baud rate and high baud rate decoders. The radio may use one or more RF front ends for all of the modulation schemes that operate in a radio band, and may be intuitively ported for operation in any arbitrary radio band(s). The radio may define a standardized internal interface for decoders, which may simplify integration of any arbitrary modulation scheme. Thus, the multichannel radio may simultaneously receive on a plurality of channels of arbitrary location, arbitrary spacing and/or arbitrary bandwidth, wherein each channel is associated with one or more of a plurality of sample rates and/or modulation schemes.

In a second example of the techniques, endpoints or nodes in an AMI/AMR network with which the radio communicates may be designed to transmit and/or receive on one or more frequencies within a specified frequency band. Unfortunately, the endpoints may not actually utilize the intended frequencies, perhaps due to their low-cost design or other errors or inaccuracies. Thus, in this second example, a radio utilizes techniques including a multichannel/multi-frequency receiver design to communicate with the endpoints. The radio may define a channel plan to include one or more channels, and each channel may include a plurality of overlapping filters. Each filter may overlap at least one other filter by at least (or approximately) an expected bandwidth of an incoming signal. Enough overlapping filters are utilized to extend over enough bandwidth (which may extend beyond the channel) to overcome an expected frequency misalignment of the system. The overlapping filters may each be configured as a channel in a channelizer, and may be associated with a same decoder in a decoder bank. This technique allows each filter to cover a narrow receive bandwidth, which will pick up less interference and noise. Due in part to the overlapping nature of the filters, the incoming signal may be received by the filter(s) that sufficiently encompass the signal. These filters may be narrower than the channel, and therefore receive less noise and interference. This improves signal-to-noise and improves the quality of the link and range.

In a third example of the techniques, bandwidth within a system may be limited with respect to an amount of data to be transmitted. While higher-throughput modulation schemes may be helpful, additional techniques may be required to transmit more data. In this third example, dissimilar modulation schemes are used within a same radio band, a same channel and/or a same frequency. In a general example, complementary modulation modes can be deployed such that simultaneous reception of packets from multiple modulation types is achieved, even while sharing portions of the same RF channel. In a more specific example, broadband advanced modulation techniques may operate well with narrow band modulation schemes in a same channel or frequency. In example operation, a multichannel radio receiver may be configured to define at least two channel plans, each channel plan having at least one channel. The channel plans may differ due to channel bandwidths, channel locations, channel number and/or channel spacing. However, the two channel plans may overlap portions of the radio spectrum. Two different and complementary modulation schemes may be used on the two channel plans, respectively. The modulation schemes may be supported by operation of least two decoders, respectively, which may operate simultaneously. Each of the complementary modulation schemes reject signals associated with the other. Accordingly, portions of the radio spectrum are used simultaneously by at least two channel plans and at least two modulation schemes, respectively.

In a fourth example of the techniques, within any RF band used by an AMI/AMR network, it may be desirable to locate quiet portions of the spectrum and/or quiet channels defined in the spectrum. To locate such spectrum and/or channels, a multichannel radio receiver may be configured for real-time radio channel assessment. In one example, a radio frequency (RF) front end provides a frequency spectrum which is converted into a digitized spectrum. Within a digital subsystem, resources (e.g., software and/or a hardware device(s)) may analyze digitized spectrum and/or a plurality of channels defined within the spectrum for a packet error rate (PER) at a plurality of power levels and a plurality of modulation schemes. The analysis may result a required received signal strength indicator (RSSI) that is needed to result in communication having at least a particular read reliability requirement (RRR). Using the required RS SI value(s), endpoints communicating with the multichannel radio may be associated with a channel and/or channel plan, modulation scheme and/or power level that results in the RRR. The analysis may be performed by one or more resources operating in parallel with, and/or in the background to, other communications between the endpoints and the multichannel radio receiver.

In a fifth example of the techniques, known radios have used RF front ends and digital subsystems that are closely related. In such radios, the analog to digital converter (ADC) and rate of sampling is coupled to downstream processing. Accordingly, a channel plan may force specific requirements on the ADC, which in turn may limit radio flexibility. In one example, a multi-channel radio may derive a channel plan independent of the ADC sample rate by using digital I/Q mixing (e.g., mixing of a complex signal containing both real and imaginary components), efficient re-sampling and filtering techniques. The multichannel radio receiver may include a radio frequency (RF) subsystem and a digital subsystem. The RF subsystem may be configured to provide analog information associated with a radio band to the ADC. The ADC samples the analog input and sends digital output to the digital subsystem. The digital subsystem may be configured with one or more channelizers and one or more decoders. A channelizer within the digital subsystem may filter and re-sample the digital output to result in a channel plan having a desired bandwidth and a desired sample rate. The sample rate may be selected for compatibility with a decoder. The decoder may have design specifications based in part on a modulation scheme to be decoded. The design specifications may indicate the desired sample rate to be provided by the channelizer.

In a sixth example of the techniques, a decoder is described for demodulating a plurality of modulation schemes, such as FSK/MSK. In one example, the decoder is configured to operate close to the radio noise floor. A correlation value may be constantly updated, in an effort to correlate and/or match the calculated correlation value of a preamble of a packet to a signature. A low clamp value may act as a floor to which a calculated correlation value is set, if the calculated value is less than the low clamp value. If a correlation threshold is exceeded, then the correlation value is examined to determine it is a peak value. If the peak is found, power of the preamble is compared to a power threshold that is relative to the radio noise floor. If the power threshold is exceeded, positive correlation is detected and the payload of the packet may be decoded. A channel optimizer is used to remove the frequency misalignment. This enables the use of a filter that is approximately equal to the occupied bandwidth of the incoming signal, further rejecting noise and interference.

In a seventh example of the techniques, an AMI/AMR RF network may include a number of endpoints that are of a low-cost construction, possibly having inaccurate clocks and/or other components. Such endpoints may transmit and/or receive on frequencies that are misaligned from intended frequencies and/or frequencies tuned by a receiver. In one example of the disclosed techniques, the central device may estimate the frequency error of the low-cost device. Using the estimate, the central device may transmit to, and/or receive data from, the misaligned endpoint on its actual transmit frequency, rather than the intended frequency. In one example, a radio includes a radio frequency (RF) subsystem to process analog information. A digital subsystem receives input from the RF subsystem, and may include a frequency error estimator and a transmitter. The frequency error estimator may be configured to receive samples from the digital subsystem and to estimate a frequency misalignment, between transmitter and receiver, of each of a plurality of received signals in real time. The transmitter may be configured to transmit to each of a plurality of downstream endpoints on frequencies based in part on the respective estimated frequency misalignments. Such transmissions, at frequencies expected by each of the downstream endpoints, allow the use of narrower receiver filters by those endpoints. In one example, the plurality of received signals may be associated with packets of a plurality of different channel plans, with different channel bandwidths and/or channel spacing, and different channel modulation schemes.

The discussion herein includes several sections. Each section is intended to be an example of techniques and/or structures, but is not intended to indicate elements which must be used and/or performed.

A section entitled "Example Radio Design" discusses example structure and operation of a multichannel radio.

A section entitled "Radio to Support Channel Plans of Arbitrary Width and/or Spacing" discusses creation and placement of channels of arbitrary and/or irregular widths that may be separated by arbitrary and/or irregular distances.

A section entitled "Multichannel Radio Receiver with Overlapping Filters" discusses overlapping filters over a region of frequency misalignment expected within a system.

A section entitled "Simultaneous Reception of Multiple Modulation Schemes" discusses simultaneous use of multiple modulation schemes within a single channel.

A section entitled "Real-Time Radio Spectrum-Assessment Engine" discusses evaluation of channels and association of devices and appropriate channels.

A section entitled "Radio with Analog to Digital Sample Rate Decoupled from Digital Subsystem" discusses a channel plan independent of, and decoupled from, the sample rate by using digital I/Q mixing, efficient re-sampling and filtering techniques.

A section entitled "FSK/MSK Decoder" discusses example decoder techniques, and provides example use in an FSK modulation scheme.

A section entitled "Radio to Detect and Compensate for Frequency Error" discusses frequency misalignment and techniques to detect, measure and compensate for the error.

Finally, the discussion ends with a brief conclusion. This brief introduction is provided for the reader's convenience and is not intended to describe and/or limit the scope of the claims or any section of this disclosure.

Example Radio Design

FIG. 1 shows an example AMI/AMR network 100 utilizing a radio having one or more of the features and techniques discussed herein. The network 100 may include a central office 102, which may be associated with a utility company or other data processing entity. The central office may communicate through a network 104, which may be the Internet or other network having widespread or local functionality. A data collector and/or concentrator 106 may be configured with a radio for RF communication with a plurality of downstream devices. In the example shown, a plurality of network nodes, such as endpoints 108-120 may be configured in a mesh network, star network or other configuration. One or more of the endpoints 108-120 may be configured for RF communication with the data collector 106. In an example operation, the data collector 106 may receive data or other communications from the endpoints 108-120. The data may include consumption information associated with an electric, gas or water meter. Additionally, the data collector 106 may send software updates, firmware updates, instructions or other information to one or more of the endpoints 108-120.

In an expanded view, aspects of a radio of data collector 106 are shown. In particular, a simplified block diagram shows an example radio receiver physical layer 122. The radio may be used for any desired purpose, such as communication with the plurality of endpoints 108-120. An RF subsystem or front end 124 may provide an analog signal covering an entire radio band to a digital subsystem 126. The analog signal may be provided in the time domain. An analog to digital converter (ADC) 128 may be in the RF subsystem 124, the digital subsystem 126 or between the two. For purposes of illustrative clarity, only the receive structures and/or functionality are shown; however, analogous transmit functions may also be present. In the example shown, a variety of functional blocks are indicated in the digital subsystem 126, including an analog to digital converter (ADC) 128 and a field programmable gate array (FPGA) 130. While an FPGA is shown, an application specific integrated circuit (ASIC) and/or other logic device may be used. The FPGA may be in communication with (or combined with) a digital signal processor (DSP). The digital signal processor (DSP) 134 and an advanced RISC machine (ARM) 136 may be in communication, such as by means of a shared memory device 138.

In one example of operation, the digital subsystem 126 receives a down-converted and filtered signal from the radio frequency (RF) subsystem 124, which contains information representative of an entire radio band of interest. Filtering provided by the RF subsystem 124 attenuates signals outside the radio band to prevent any aliased products from interfering with the targeted received signals. The digital receiver subsystem 126 may sample intermediate frequency (IF) signals provided by the RF subsystem 124 and perform calculations to create parallel RF channels of incoming signal data. In one example, the ADC 128 converts the analog signal into a sampled digital representation. The FPGA 130 receives the digital representation, and channelizes and re-samples it into discrete channels. The FPGA 130 may also provide a correlating detector to identify known preamble signatures. The decoding capability of the digital subsystem 126 (which may be located in the FPGA 130) detects, identifies, modulates and/or demodulates multiple modulation schemes, e.g., on-off keying (OOK) and/or GFSK modulation. Once correlation is achieved, the FPGA 130 then decodes raw samples into bits and passes words (e.g., 16-bit words) to the DSP processor 134. The DSP 134 provides packet decoding, cyclic redundancy code (CRC) validation, and if available, forward error correction (FEC) for each successfully detected packet. The ARM 136 provides the command interface with a host, such as by using a universal asynchronous receiver/transmitter (UART) either embedded in the FPGA 130, or provided directly by the OMAP processor 132.

Figure 2:
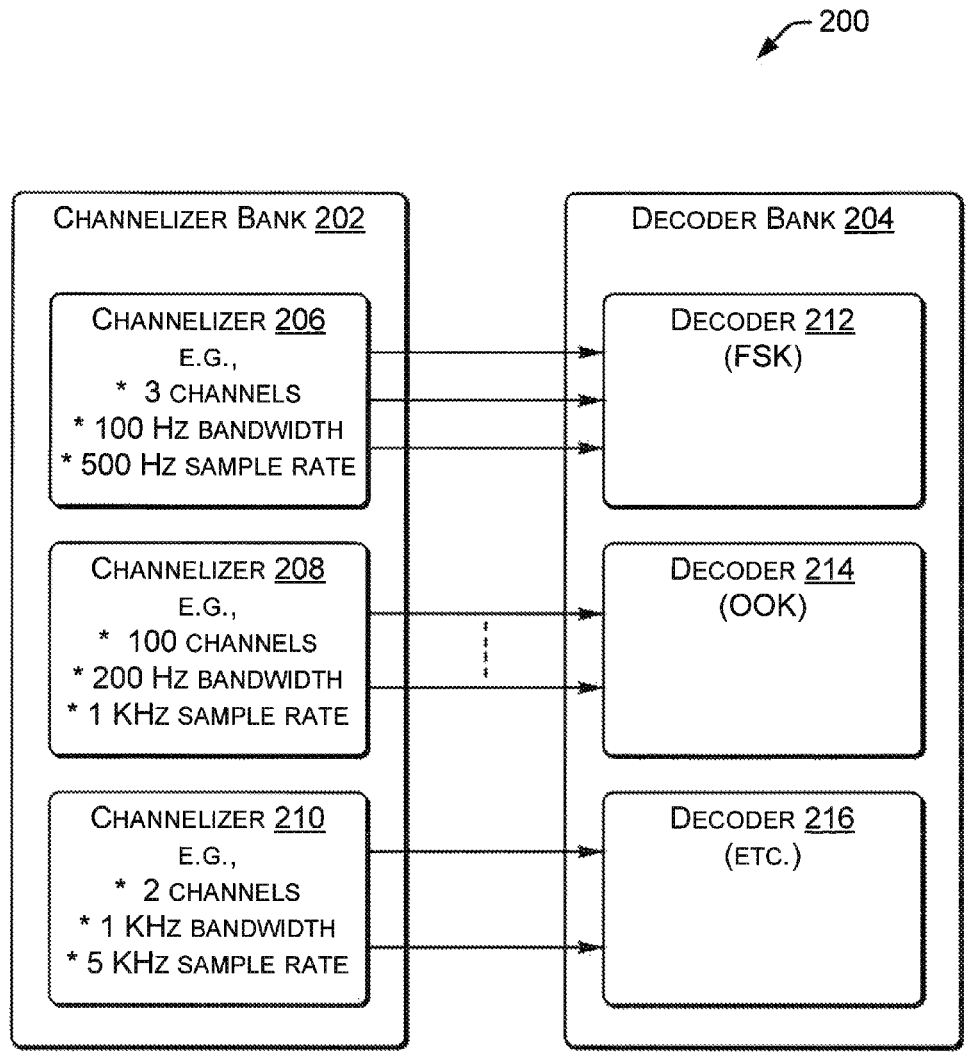
FIG. 2 is a high level block diagram of a channelizer bank and a decoder bank, and illustrating an example relationship between the two.

FIG. 2 shows example logic 200 including a channelizer bank 202 and a decoder bank 204. In one example, the channelizer bank 202 receives input from an ADC (not shown) and the decoder bank provides output to a DSP/ARM (not shown). In the example of FIG. 1, where the channelizer bank 202 and decoder bank 204 are located in the FPGA 130, they can be configured and/or reconfigured by programming within the FPGA.

The channelizer bank 202 may include any number of channelizers; in the example shown, three channelizers 206, 208 and 210 are shown. The channelizer bank may be extensible, in that additional channelizers may be added to, and/or substituted for, existing channelizers. Each channelizer may perform several functions, including the following three. First, each channelizer may tune the ADC band spectrum to create a target channel plan. Each channelizer may tune band spectrum using one or more complex mixers. In the example shown, channelizer 206 has tuned three channels, while channelizers 208 and 210 have tuned 100 channels and 2 channels, respectively. Note that the channels may be located at any desired location, and that spacing between channels is not required to be regular (i.e., even, uniform and/or same spacing between channel center frequencies). Second, each channelizer may resample the incoming data (previously sampled by the ADC) to a sample rate required by a decoder to which the data will be sent. Such re-sampling of the data essentially decouples the ADC from the decoder, and allows selection of the ADC sample rate without regard to the modulation scheme to be used. In the example shown, channelizer 206 re-samples to a 500 Hz rate, while channelizers 208, 210 re-sample to 1 KHz and 5 KHz, respectively. Third, each channelizer sets a receive bandwidth filter to a desired size. In the example shown, channelizer 206 set a 100 Hz bandwidth filter, while channelizers 208, 210 set 200 Hz and 1 KHz bandwidth filters. Note that each channelizer may set a different receive filter bandwidth, so that two or more channelizers may create channels that overlap on each other. The output of each channelizer may be sent to one or more decoders, based in part on which modulation schemes utilize the channel plan of the channelizer. In the example shown, the output of channelizers 206, 208, 210 are sent to decoders 212, 214, 216, respectively.

The decoder bank 204 may include any desired number of decoders, based only on a size of the supporting logic device. The decoder bank may be extensible, in that additional decoders may be added to, and/or substituted for, existing decoders. Each decoder may decode a particular modulation scheme. In the example of FIG. 2, decoders 212, 214 decode FSK and OOK modulation schemes. Decoder 216 (and any other decoders, not shown) may decode other modulation schemes. Accordingly, the example logic allows creation of any desired number of channels, placement of the channels at any desired locations, any desired spacing and/or overlap. Moreover, the channel plan of any channelizer may be decoded according to any desired modulation scheme(s).

Figure 3:
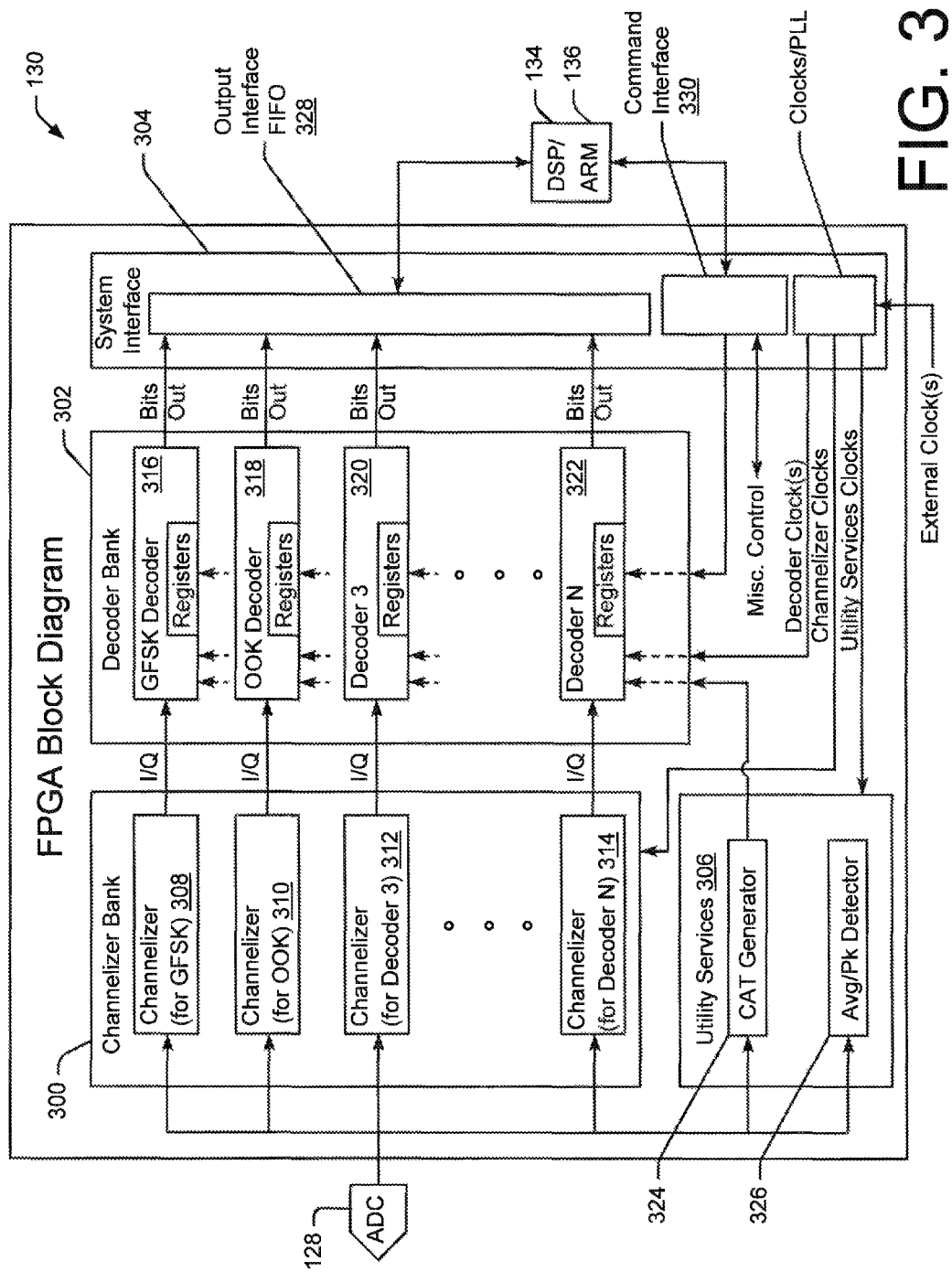
FIG. 3 is a block diagram showing details of an example channelizer bank and decoder bank within an example field programmable gate array (FPGA).

FIG. 3 shows example detail of the field programmable gate array 130 of FIG. 1. In some implementations, the FPGA 130 may contain high-speed digital signal processing blocks that may not be suitable for inclusion in the DSP processor 134 found in the OMAP 132. In the example shown, the primary blocks of the FPGA 130 include a channelizer bank 300, a decoder bank 302, a system interface 304, and utility services 306. Each block may contain standard interfaces to simplify the process of adding new features.

The channelizer bank 300 may contain a plurality of channelizers. In the example shown, the channelizer bank 300 contains channelizers 308-314, which are representative of a plurality of channelizers, each of which may provide output to one or more modulation decoder(s) in the decoder bank 302. The associating of channelizers and decoders allows multiple modulation schemes with differing channel plans to operate in parallel. Each channelizer 308-314 may input raw samples from the analog to digital converter 128. The output of each channelizer 308-314 will include baseband I/Q samples for every supported channel in the channel plan of the particular channelizer. Collectively, the channelizers in the channelizer bank 300 may output a plurality of parallel channels of baseband I/Q samples. Each channel of I/Q samples was tuned to a desired frequency, filtered to a desired receive bandwidth, and re-sampled to the sample rate required by the modulation decoder to which it is paired. In one specific example, the channelizer 308 may include 128 channels, resulting in 128 parallel output channels located at desired channel locations. In the specific example, each channel may be filtered to a 100 kHz bandwidth and decimated to a 600 kHz sample rate. Each channel may then be presented to a decoder for decoding (e.g., decoding of GFSK modulation).

The decoder bank 302 may contain a decoder or decoder block for each supported modulation scheme. Thus, the decoder bank 302 may include multiple decoders, decoding multiple protocols. The number of decoders and/or protocols is limited only by the availability of resources in the FPGA 130. In the example shown, decoders 316-322 are representative of a plurality of decoders associated with a plurality of modulation schemes. For example, decoder 316 is associated with the GFSK format and decoder 318 is associated with the OOK format. Interfaces to the decoder block may be standardized to simplify the integration of additional modulation schemes.

In example operation, a channelizer in the channelizer bank 300 may properly condition input samples for use by a decoder in the decoder bank 302. The conditioning may process the input samples to meet requirements of a modulation scheme associated with the decoder to which the samples are sent. Accordingly, one or more decoders in the decoder bank 302 input complex (I/Q) baseband sample streams that have been tuned, filtered and re-sampled, and that are ready for demodulation. Each decoder in the decoder bank 302 contains an appropriate demodulator for signal demodulation, including packet preamble detection. Once a valid signal is detected, the decoder will construct the received bits and send them to the output interface (in the example of FIG. 3, shown within the system interface 304). These bits are ultimately sent to the DSP processor 134 for packet reconstruction.

The system interface 304 may provide an interconnection between the internal operating structures of the FPGA 130 and the externally located DSP 134. The system interface 304 contains memory mapping logic to decode universal asynchronous receiver/transmitter (UART) registers, various control and command registers 330, first-in/first-out (FIFO) buffers 328, and internal memory blocks accessible to the DSP 134. The system interface 304 may also contain clock generators for all the required clocks found in the FPGA 130.

The channel assessment technology (CAT) generator 324 may be located within a real-time channel assessment technology engine (as discussed later with respect to FIG. 12). Channel assessment measures a packet error rate (PER) and determines a required received signal strength indicator (RSSI) to result in a read reliability requirement for one or more channels. The CAT generator 324 may transmit a digital I/Q test signal that is used by the CAT engine (discussed further with respect to FIG. 12). These I/Q test signals may be stored in RAM and ultimately channeled to the appropriate decoder in decoder bank 302. The exact decoder to which the signals are channeled depends on a modulation of the signal. The CAT engine has the ability to non-intrusively measure the read reliability for each channel while operating in the network. Such measurement may be used to predict the required level (e.g., power level) for the received signal for supporting pre-defined read reliability goals. Accordingly, optimum channel plans that support a targeted read reliability performance may be determined in real time. Having continuous, periodic or on-demand read reliability channel assessment capability built into the radio improves and maintains channel allocation over time, thereby adapting to an evolving interference signature.

Average and peak detectors 326 may be connected directly to the ADC 128. The connection allows for both average power and peak power measurements to be taken for the entire received radio band. The average and peak detectors 326 can be used for calibrating the RF receiver along with auto-ranging if desired. The average and peak detectors 326 detector can generate an interrupt if the peak signal approaches full-scale on the ADC. If this condition occurs, the quality of the downstream digital signal processing may be compromised. Example calculations for average power and peak power are shown in Equation (1).

In the example:

$$RSSI = \sum_{n=1}^{N} \frac{x[n]^2}{N} V^2 \qquad \text{Equation (1)}$$

Average Power =

$$10\log_{10}(RSSI * 1000) + CalFactor \; dBm$$

Max $ADC = \max(|x[n]|)$

-continued

Peak Power =

$$10\log_{10}(\text{Max } ADC^2 * 1000) + CalFactor \; dBm$$

Figure 4:
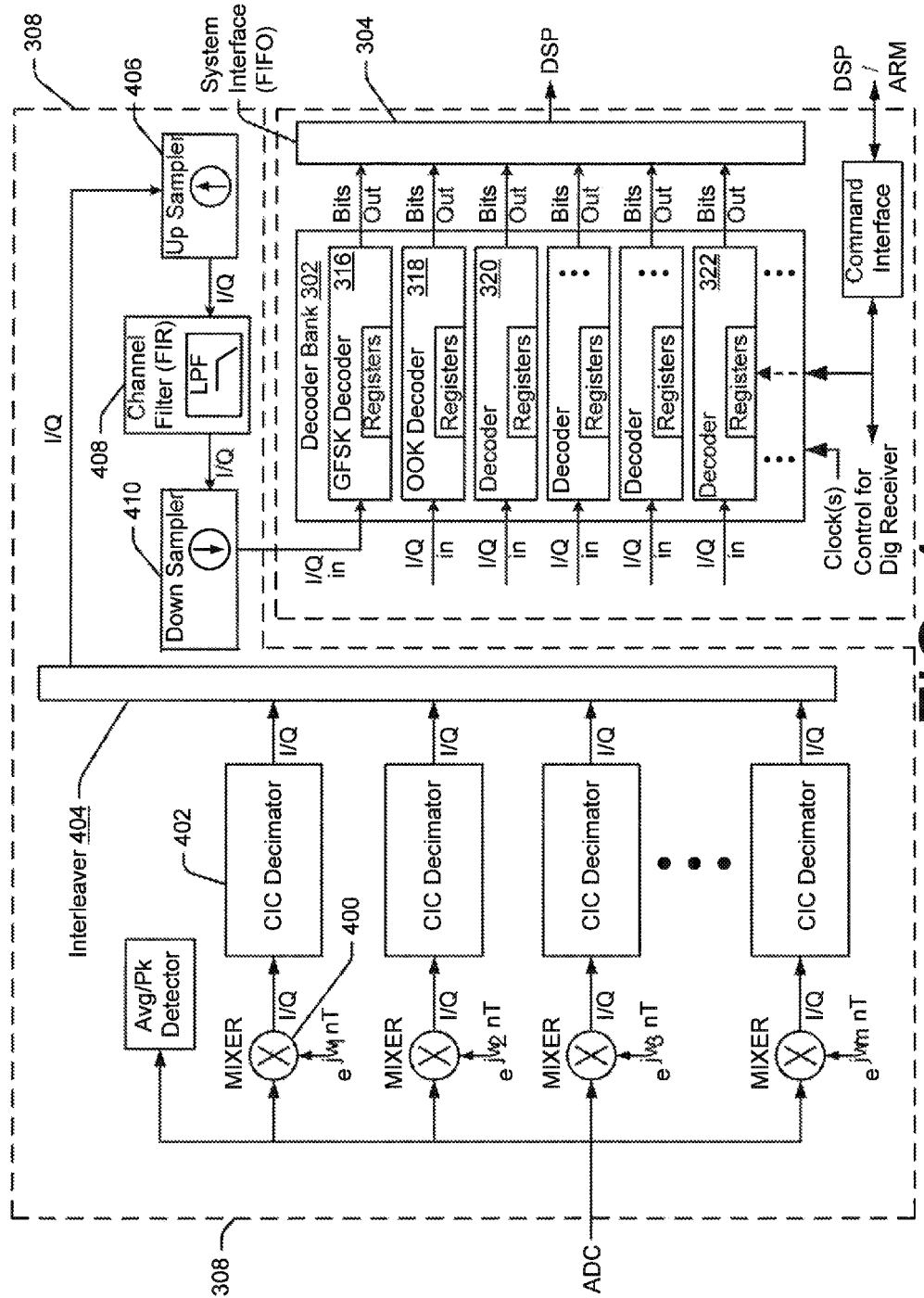
FIG. 4 is a block diagram showing detail of an example channelizer providing output to a decoder within a decoder bank within the FPGA or other logic device.

Average Power (dBm)
RSSI ($V^2$) Received Signal Strength Indicator base on raw samples
Max ADC Absolute value of the maximum ADC sample
Peak Power (dBm)
x[n] ADC sample data for sample range of N
N Total Number of samples
CalFactor (dBm) Calibration that is generated in the factory FIG. 4 illustrates details of an example channelizer 308 from within a channelizer bank (shown in FIG. 3) and an associated decoder 316 within the decoder bank 302. The channelizer and decoders may be located within a gate array (e.g., an FPGA 130) or other logic device. The channelizer 308 receives samples from an analog to digital converter (e.g., ADC 128 as seen in FIG. 3). The samples may contain or represent an entire radio band. The channelizer 308 translates the received samples into a plurality of parallel channels. The output of the channelizer 308 includes down-converted I/Q baseband samples which have been filtered and re-sampled. The re-sample rate of a channel may be based in part on a modulation scheme to be used. The channelizer bank supports the sample rates and bandwidths required by most modulation schemes in a very flexible manner. For example, a new modulation scheme may be supported by adding a channelizer to the channelizer bank 300 (e.g., as seen in FIG. 3) and an associated decoder to the decoder bank 302. According to the association, each channelizer provides input expected by an associated decoder that is consistent with the modulation associated with that decoder.

The channelizer 308 may include a complex mixer 400 and a cascaded integrator comb (CIC) decimator 402. The collective output of the channelizers 308-314 (previously shown in FIG. 3) may be processed by an interleaver 404, an up-sampler 406, a channel filter 408 and down-sampler 410. In one example, an arbitrary re-sampler may be used in place of the up-sampler 406 and down-sampler 410. A single channel may include a unique complex mixer and CIC stage. Accordingly, an N-channel channelizer may include N-number of complex mixers and N-number of CIC decimators. The output of each CIC decimator 402 may be sent to the interleaver 404. Since the output sample rate of the CIC decimator 402 is substantially lower than its input, the rate of subsequent stages is also lower. By over-clocking these subsequent stages, the same blocks (e.g., within an FPGA) may be used for multiple channels by interleaving them. This technique dramatically reduces the amount of resources within the gate array 130 as long the as the FPGA, limited by its maximum clock rate, can over-clock these blocks.

The CIC decimator 402 may allow only integer rate changes of the ADC sample rate. This may be insufficient to achieve the sample rate required by a decoder (e.g., one of decoders 316-322, etc.). Therefore, in some embodiments an up-sampler stage 406 and a down-sampler stage 410 may be included. Up-sampling may be a process of increasing the sample rate, such as by inserting zero(s) between each sample. Downsampling is a process of reducing the sampler rate, which can be accomplished by throwing away samples (assuming adequate filtering from the channel filter prevents aliasing). The output sample rate of example up-sampler 406 and down-sampler process can be determined from Equation (2).

$$fs_o = fs * \left(\frac{L}{R*M}\right) \qquad \text{Equation (2)}$$

where,
   $fs_o$ (Hz), output sample rate of the up-sampler;
   fs (Hz), ADC sample rate;
   R (integer), rate change factor found in the CIC;
   L (integer), up-sampling factor; and
   M (integer), down-sampling factor.

In a specific example, a desired sample rate for a GFSK decoder may be 600 kHz. This can be achieved by setting the ADC sample rate to fs=51.2 MHz, the decimation factor R=256 (found in the CIC) and the Up-sampling factor L=3. Output of the up-sampler 406 may be sent to channel filter 408 and down sampler 410.

Figure 5:
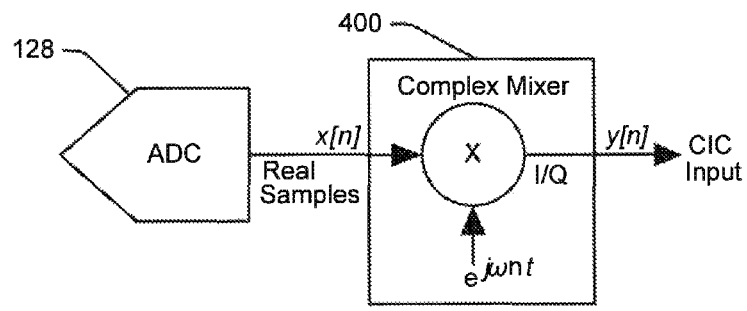
FIG. 5 is a block diagram showing example structure of an analog to digital converter and a complex mixer.

FIG. 5 shows example structure of an analog to digital converter 128 and a complex digital mixer 400, discussed in more general terms with respect to FIG. 4. A purpose of the complex digital mixer 400 is to down-convert the real samples coming from the ADC 128 to result in a complex baseband signal (I/Q data) that is centered at (i.e., tuned to) a desired channel. The output of the ADC 128 may include real samples, i.e., the samples include no imaginary components. A complex signal contains both real and imaginary components and is often referred to as I/Q data. A complex signal allows the positive and negative frequencies to be asymmetrical. By converting a signal of the ADC 128 to a complex baseband signal, a much simpler low pass filter (LPF) can be applied. The LPF may then reject out-of-channel signals in the ADC samples, leaving only the signal found in the channel along with up-sampling spurs from the zero-stuffing process in up-sampler 406. An example mathematical operation of the complex digital mixer 400 is shown in Equation (3).

$$y[n]=A[n]+jB[n]=x[n]*e^{j\omega nT} \qquad \text{Equation (3)}$$

where,
   A[n] Real part of the output sample array;
   B[n] Imaginary part of the output sample array;
   y[n] (samples), output (complex) sample array;
   x[n] (samples), input (real) sample array;
   n (integer), subscript for sample number or location;
   T (sec), sample period; and
   ω (radians), rotational frequency of the channel.

Figure 6:
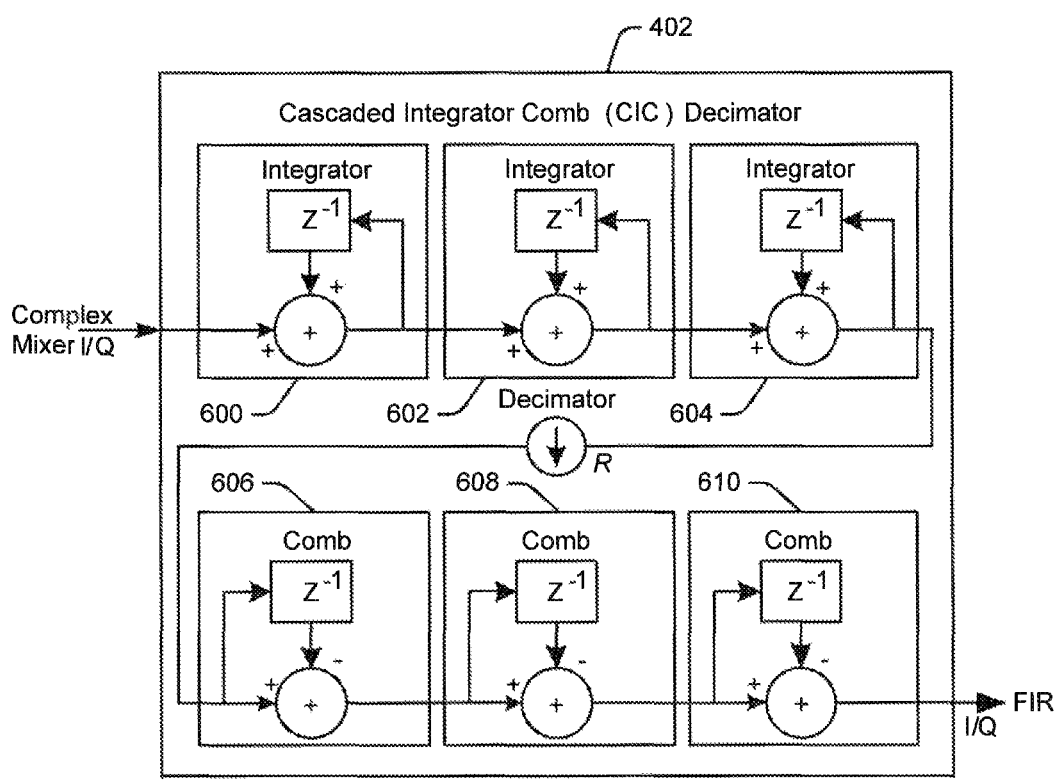
FIG. 6 is a block diagram showing example detail of a cascaded integrator comb (CIC) decimator.

FIG. 6 shows example detail of a cascaded integrator comb (CIC) decimator 402, discussed in more general terms with respect to FIG. 4. A CIC decimator may provide efficient multiplier-free filtration and arbitrary and/or large decimation or interpolation capability. The CIC decimator 402 is well-suited for use with the hardware (e.g., FPGA) implementations of FIGS. 1-4, especially when large decimation factors are required. Such decimation factors are typically required for a channelizer (e.g., channelizers 308-314 of FIG. 3) where large analog to digital sample rates are required and require down-sampling to very low decoder rates. In one example, a 3$^{rd}$ order decimator having a differential delay=1 may be used. However, these are parameters which can easily be tuned to achieve a more efficient implementation. As shown in FIG. 6, the two basic building blocks are integrator blocks 600-604 and comb blocks 606-610, with a decimation stage used for rate changes.

The integrator is a single pole infinite impulse response (IIR) filter with unity feedback, which is similar to a low pass filter with a pole at zero hertz. The mathematical equation for an example single integrator stage is shown in Equation (4).

$$y[n]=y[n-1]+x[n] \qquad \text{Equation (4)}$$

where,
   y[n] (samples), output (complex) sample array of a single integrator stage;
   x[n] (samples), input (complex) sample array of the integrator stage; and
   n (integer), subscript for sample number or location.

The comb filters 600-604 are finite impulse response filters (FIR) with a rate change (R) which is a high pass filter with a zero at zero Hz and a weight for each tap equal to one. The mathematical equation for a single comb stage is shown in Equation (5).

$$y[n]=x[n]-x[n-R] \qquad \text{Equation (5)}$$

where,
   y[n] (samples), output (complex) sample array of a single Comb stage;
   x[n] (samples), input (real) sample array of the Comb stage;
   n (integer), subscript for sample number or location; and
   R (integer), decimation rate change factor.

Serializing the integrator blocks 600-604 and comb blocks 606-610 results in an efficient decimation block. The CIC decimator 402 may have extremely poor flatness, with nulls found at fs/R. An example total transfer function is shown in Equation (6).

$$H[z] = \frac{(1-z^{-R})^N}{(1-z^{-1})^N} \qquad \text{Equation (6)}$$

where,
   H[z] output transfer function;
   z jωt frequency location;
   N (integer), number of stages; and
   R (integer), decimation rate change factor.

The output sample rate of the CIC decimator 402 is the input sample rate divided by the range factor.

$$fs_o = \frac{fs}{R} \qquad \text{Equation (7)}$$

where,
   $fs_o$ (Hz), output sample rate;
   fs (Hz), ADC sample rate; and
   R (integer), decimation rate change factor.

In one example, the frequency response of the CIC block is $f_s$=51.2 MHz and R=256, which results in an output sample rate ($fs_o$) of 200 kHz. When using a differential delay=1, there are spectrum nulls at multiples of the output sample rate. Placing nulls at 200 kHz offsets will effectively attenuate all of the GFSK signals that are centered on their respective channel locations for the entire radio band.

As previously mentioned, the CIC is unflat which will be a problem if uncorrected. Therefore, a downstream FIR filter (e.g., FIR filter 408 of FIG. 4) may be used to compensate for this unflatness. The FIR filter may also remove resample spurs of an up-sampler and set the desired receive bandwidth.

Figure 7:
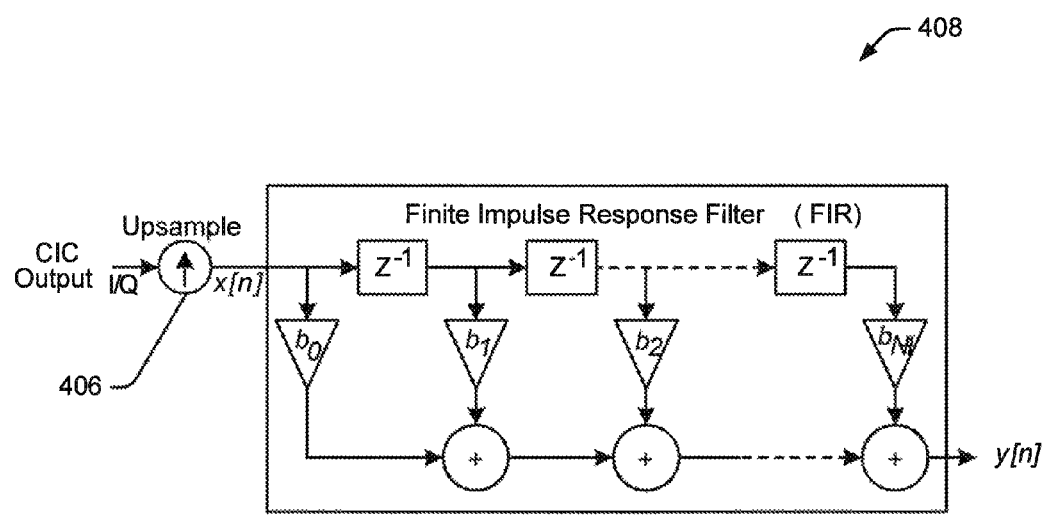
FIG. 7 shows example detail of a finite impulse response (FIR) filter.

FIG. 7 shows example details of a finite impulse response (FIR) filter 408 (e.g., the FIR filter shown in FIG. 4). The FIR filter 408 is an example of a channel filter that may be used for similar purposes. The FIR filter 408 creates the desired receive bandwidth for the decoder (e.g., one of decoders 316-322 in the decoder bank 302 of FIG. 3). However, FIR filter 408 also compensates for the unflatness of the CIC block 402 (seen in FIG. 4), and is used to smooth out the zero-inserting process of the up-sampler block (e.g., upsampler 406 of FIG. 4). The filter 408 may use discrete finite impulse response (FIR) filter topology. A FIR filter is a linear phase filter that has an impulse response of a finite length. The output of the filter may be a weighted sum of the current and finite number of previous values of the input.

The mathematical model for an example FIR filter is found in Equation (8).

$$y[n] = b_0 x[n] + b_1 x[n-1] + \ldots + b_{N-1} x[n-N-1] \quad \text{Equation (8)}$$
$$= \sum_{i=0}^{N-1} b_i x[n-i]$$

where,
y[n] Output filtered sample array;
x[n] Input sample array;
$b_i$ Coefficients for the FIR filter;
n (integer), subscript for sample number or location; and
N (integer), number of taps in the filter.

The design of filter 408 may include constraints. First, the design may be such that the desired channel filter response is convolved with the CIC unflatness. And second, the design may provide rejection of up-sampling spurs. This will support an efficient single filter design that can achieve three different purposes (CIC correction, filter up-sampling spurs, and shape the channel receive filter). In one example, the channelizer frequency response for 100 kHz received filter bandwidth with an output sample rate of 600 kHz may be used as a GFSK solution. Such an implementation may result in an extremely flat overall response in the pass-band, with nulls placed at 200 kHz offsets. Adjacent channel selectivity can be further improved by adding more stages to the CIC filter.

FIGS. 8-24 are diagrams illustrating example methods for operating a radio. The example methods of FIGS. 8-24 can be understood in part by reference to the configurations of FIGS. 1-7. However, FIGS. 8-24 are not limited by other drawing figures and/or prior discussion. Each method described herein is illustrated as a collection of blocks or operations in a logical flow graph, which represent a sequence of operations that can be implemented in hardware, software, or a combination thereof. In the context of software, the operations represent computer-executable instructions stored on one or more computer-readable storage media that, when executed by one or more processors, perform the recited operations. Computer-readable media, as the term is used herein, includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communications media.

Radio to Support Channel Plans of Arbitrary Width and/or Spacing

A multichannel radio architecture may include an RF subsystem (e.g., an analog RF front end) and a digital subsystem. The digital subsystem may be configured in a field programmable gate array (FPGA), an application specific integrated circuit (ASIC), a digital signal processor (DSP) and/or other logic device. The digital subsystem may provide multichannel functionality for both reception and transmission. The digital subsystem may be configured to use an analog to digital converter (ADC) to sample input. A channelizer bank within the digital subsystem may include a plurality of channelizers. Each channelizer may receive and translate input from the ADC into a plurality of channels, the channels having bandwidths that are non-uniform and/or spacing (e.g., spacing center-to-center of adjacent channels) that is irregular. The translation may include re-sampling channels at a rate associated with a modulation scheme. A decoder bank may include a plurality of decoders operating in parallel, each to receive input from one or more channelizers and each associated with a particular modulation scheme. The radio may support a virtually unlimited number of modulation schemes, from primitive schemes (GFSK, GMSK, OOK, etc.) to advanced modulation schemes, limited only by the size of the logic device. Moreover, many modulation schemes operated at different baud rates may be considered to be different modulation schemes. The radio may be configured to simultaneously receive data using any of the installed modulation decoders on any of the channels. The radio may support a broad range of baud rates, e.g., allowing for parallel operation of narrow-band baud rate and high baud rate decoders. The radio may use one or more RF front ends for all of the modulation schemes that operate in a radio band, and may be intuitively ported for operation in any arbitrary radio band(s). The radio may define a standardized internal interface for decoders, which may simplify integration of any arbitrary modulation scheme. Thus, the multichannel radio may simultaneously receive on a plurality of channels of arbitrary location, arbitrary spacing and/or arbitrary bandwidth, at any desired sample rate, wherein each channel is associated with one or more of a plurality of modulation schemes.

Figure 8:
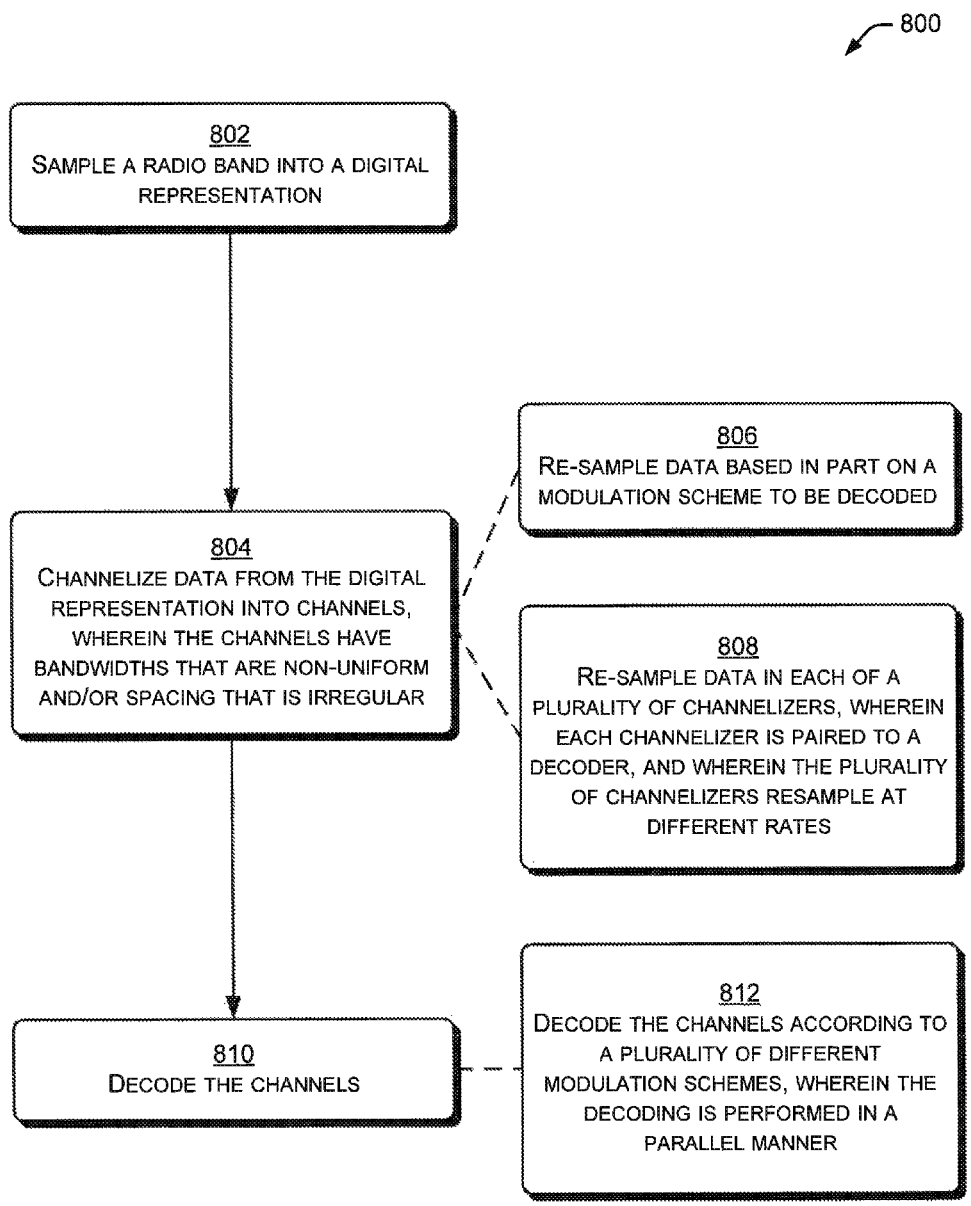
FIG. 8 is a flow diagram showing example operation of a radio to support channel plans, including arbitrary channel width and arbitrary channel spacing.

FIG. 8 shows example operation 800 of a radio to support arbitrary channel plans, including channels of differing bandwidth, differing spacing between adjacent channels and different modulations used by different channels. At operation 802, a radio band is sampled into a digital representation. In the example of FIG. 1, the RF subsystem 124 may provide an analog representation of a radio band (e.g., in the time domain) to an ADC, which samples the radio band and provides a digital representation to a digital subsystem.

At operation 804, data is "channelized" from the digital representation into channels. The channels may have bandwidths that are non-uniform and/or spacing (e.g., between adjacent channels) that is non-uniform. In the context of the example of FIG. 2, each channelizer 206-210 may create a plurality of channels located at a plurality of different locations. By utilizing a plurality of different channelizers, channels having a plurality of different widths may be obtained. Also by using a plurality of different channelizers, channels having a plurality of different sample rates (i.e., re-sampling of the original ADC sample rate) may be obtained. At operation 806, data is re-sampled, based in part on a modulation scheme to be decoded. Thus, the re-sampling could be performed at a sample rate that is consistent with a particular modulation scheme of a decoder. Similarly, in the example of operation 808, re-sampling of data is performed by channelizers, each of which may output to a decoder and each of which may resample at a rate indicated by the decoder and/or the modulation scheme of the decoder.

At operation 810, output of a plurality of channels is decoded. In the context of the example of FIG. 2, the output of each of the three channelizers is sent to at least one decoder, where it is decoded. The output may be I/Q data, which is sent at a sample rate expected by the decoder and consistent with a modulation scheme of the decoder. Each of the decoders is then able to decode the data, which may be sent to a DSP (e.g., DSP 134 of FIG. 1). In the example of operation 812, the channels are decoded according to a plurality of different modulation schemes, and may be performed in a parallel manner. In the example of FIG. 2, the decoders 212-216 operate in parallel to decode data according to three modulation schemes.

Multichannel Radio Receiver with Overlapping Filters

A multichannel radio receiver may be configured with a plurality of overlapping filters. In the example of the techniques discussed with respect to FIGS. 2-4, the filters may be defined as channels by one or more channelizers. A set or plurality of overlapping filters may be associated with each channel. Additionally, enough overlapping filters may be added to support expected frequency misalignment of the system. That is, if incoming transmissions are expected to vary in frequency by or within a known amount, then sufficient overlapping filters may be used to span/cover the portion of the frequency spectrum (possibly extending beyond the bandwidth of the channel) indicated by the expected variance of the incoming transmission. Thus, a frequency range is spanned by the plurality of overlapping filters for each channel so that an incoming signal that is within an expected (e.g., sufficiently probable) frequency misalignment of the transmitter/receiver system will be within one of the filters. In part because a number of overlapping filters are used, each filter may define a narrow receive bandwidth. In one example, each of the overlapping filters may be sized to approximately an occupied bandwidth of the incoming signal(s). The narrow filter (e.g., sized to a bandwidth of an expected incoming signal) will pick up less interference and noise, resulting in better radio link performance. In one example, the overlapping filters may be sized at approximately 98% of the occupied band width (OBW) of the received signal to provide reliable reception. However, if the signal is at a frequency indicated by a particular filter, the signal will be received by that filter. Accordingly, the desired signal will be received only in the filters(s) that sufficiently encompass the signal. Other filters, from among the overlapping filters associated with a single channel, will not receive the signal. In some instances, only one filter will receive the incoming signal; however under some conditions two filters could receive the signal due to the overlapping nature of the design. In one example, if the signal is between centers of two filters, the signal may be substantially within a filter that overlaps portions of each of the two filters. In some example configurations, the overlapping filters may be uniform or irregular in width, placement (space between filter centers) and/or degree of overlap. Each of the overlapping filters may be configured by operation of one or more channelizers from a channelizer bank and a decoder from a decoder bank. FIGS. 2-4 provide examples of such a design.

Figure 9:
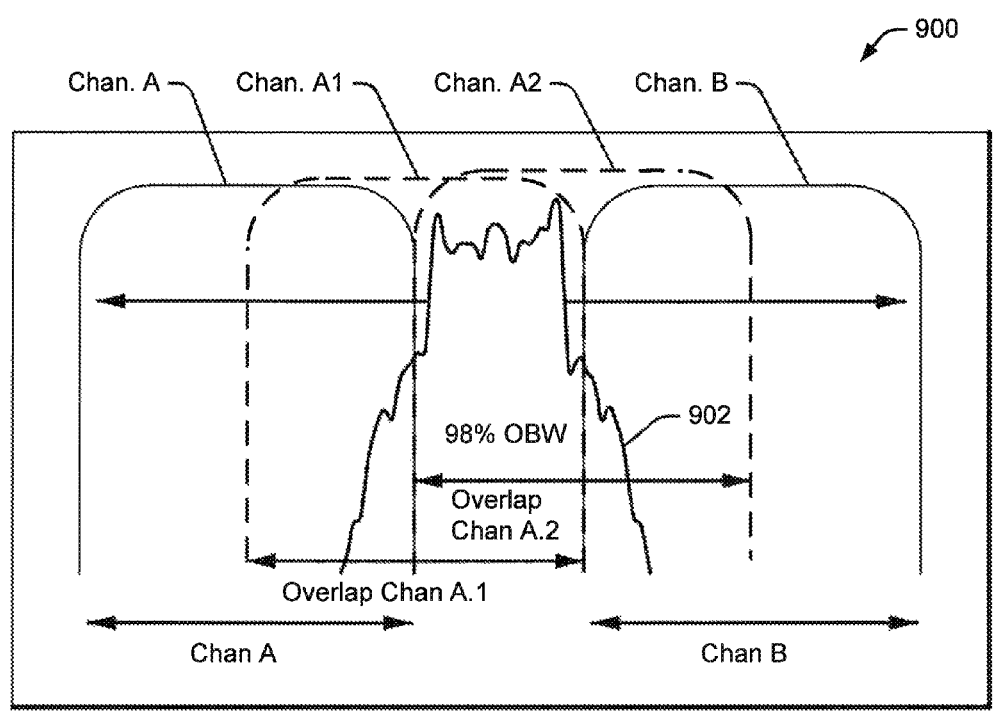
FIG. 9 is a diagram showing aspects of an example channel plan, including overlapping filters sized to contain a received signal in at least one, or possibly two, overlapping channels.
Figure 10:
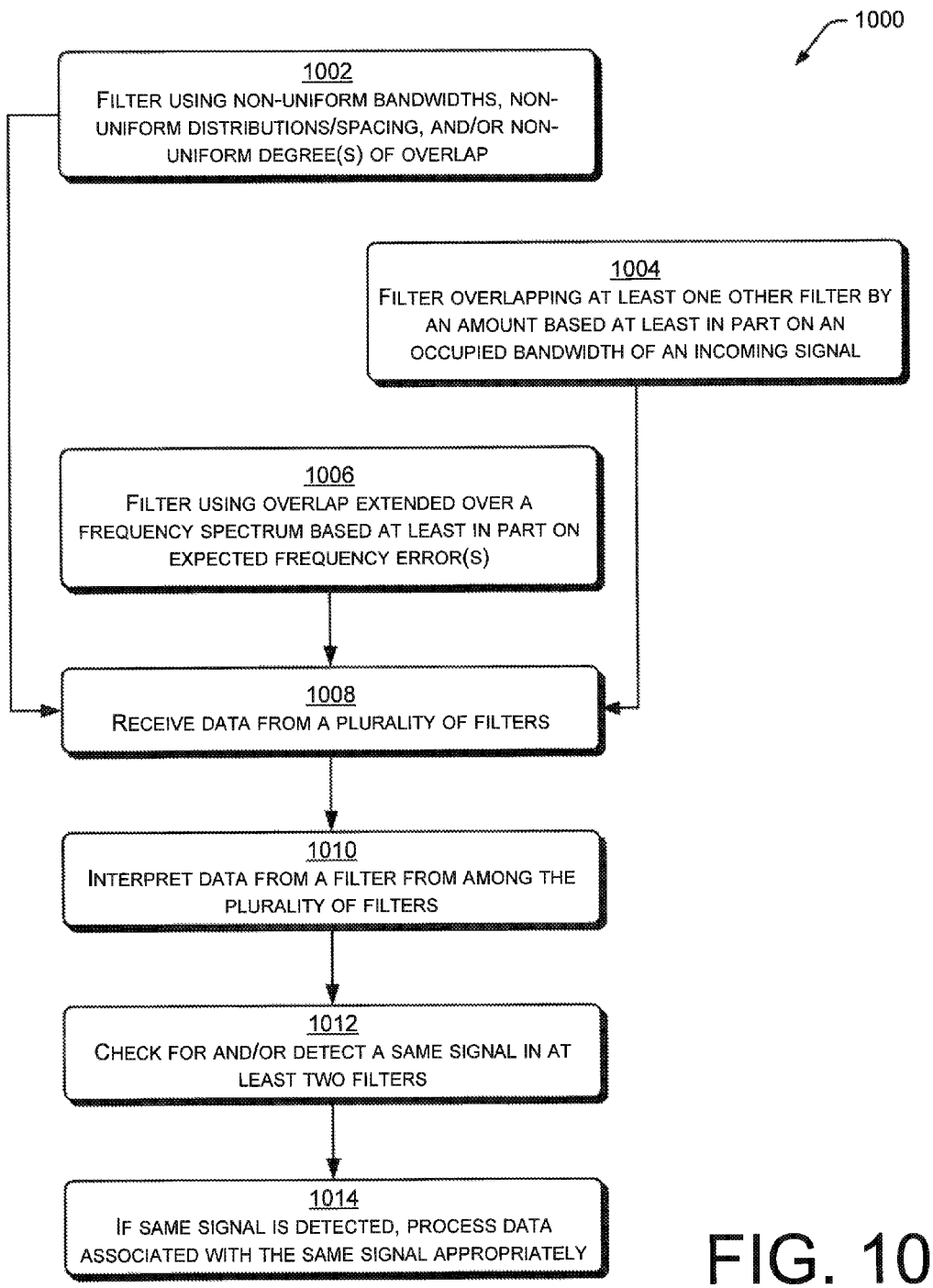
FIG. 10 is a flow diagram showing example operation of a radio supporting channel plans having arbitrary and overlapping filters.

FIG. 9 illustrates an example radio band 900 over which overlapping filters have been defined. An example in-coming signal 902 is located substantially between two channels, due to a frequency error. In the example of FIG. 9, Channels A and B depict an example channel assignment. Instead of setting the receive bandwidth of Channel A and B to touch at the midway point, the channels are set narrower to allow for two overlapping channels to coexist between them (labeled Chan. A1 and Chan. A2). As seen in FIG. 10, a signal can be at any arbitrary location between these channels and still completely reside in at least one receive filter and in some cases two. For previously known receiver designs, adding two overlapping channels (sub-channels or filters) would triple hardware requirements. However, the radio architecture described herein can efficiently support this method by simply adding channel outputs to a channelizer (e.g., the channelizer of FIGS. 2-4), which results in only a small increment in the resources required of FPGA 130.

FIG. 10 is a flow diagram showing example operation 1000 of a multichannel radio utilizing overlapping channel filters. At operation 1002, a plurality of filters may be defined and/or utilized. The filters may be of uniform or non-uniform bandwidth, uniform or non-uniform distribution (i.e., uniform or non-uniform spacing between centers of adjacent channels), and/or uniform or non-uniform degree of overlap with adjacent channels. At operation 1004, a further plurality of filters may be defined and/or utilized, which may or may not include one or more filters defined at operation 1002. In particular, filters may be defined and/or utilized that overlap at least one other filter by an amount based at least in part on an occupied bandwidth of an incoming signal. Alternatively stated, the filters may be defined and/or utilized so that it may be impossible for the incoming signal to not be fully (or almost fully) in at least one filter. At operation 1006, a further plurality of filters may be defined and/or utilized, which may or may not include one or more filters defined at operations 1002 and 1004. In particular, filters may be defined or utilized that overlap and extend over frequency spectrum based at least in part on expected frequency error(s). Thus, if the incoming signal is expected to vary by a known frequency error (and/or misalignment with the receiver) then the region of frequency spectrum over which filters are defined should be sized to receive the incoming signal despite the frequency error (or misalignment).

At operation 1008, data is received from one or more filters (e.g., one or more of the filters defined utilized in operations 1002-1006) and/or other filters. In the example of FIGS. 1-4, the data may be received by the digital subsystem.

At operation 1010, data from the one or more filters (channels) received at operation 1008 are interpreted from among the plurality of filters. In the example of FIGS. 1-4, the data may be interpreted by the digital subsystem, wherein data from the ADC is processed by one or more channelizers and sent to one or more decoders.

At operation 1012, a check may be made for a same signal detected in at least two filters. The same signal may be detected by filters associated with one or more channels. For example, the filters may be associated with two channels if the channels are closely spaced, but an expected frequency error of an endpoint is greater than the spacing. In this situation, the overlapping filters from one channel may overlap the overlapping filters from the other channel, and a signal may be received by filters associated with both channels. At operation 1014, data from the same signal is processed appropriately, such as by ignoring data from one or more filters.

Simultaneous Reception of Multiple Modulation Schemes

A radio may utilize dissimilar modulation schemes within a same radio band, a same channel and/or a same frequency. In a general example, complementary modulation modes can be deployed such that simultaneous reception of packets from multiple modulation types is achieved, even while sharing the same RF channel. In a more specific example, broadband advanced modulation techniques may operate well with narrow band modulation schemes in a same channel or frequency. In example operation, a multichannel radio receiver may be configured to define at least two channel plans, each channel plan having at least one channel. The channel plans may differ due to channel bandwidths, channel locations, channel number and/or channel spacing. However, the two channel plans may overlap portions of the radio spectrum. Two different and complementary modulation schemes may be used on the two channel plans, respectively. The modulation schemes may be supported by operation of least two decoders, respectively, which may operate simultaneously. Each of the complementary modulation schemes reject signals associated with the other. Accordingly, portions of the radio spectrum are used simultaneously by at least two channel plans and at least two modulation schemes, respectively.

Figure 11:
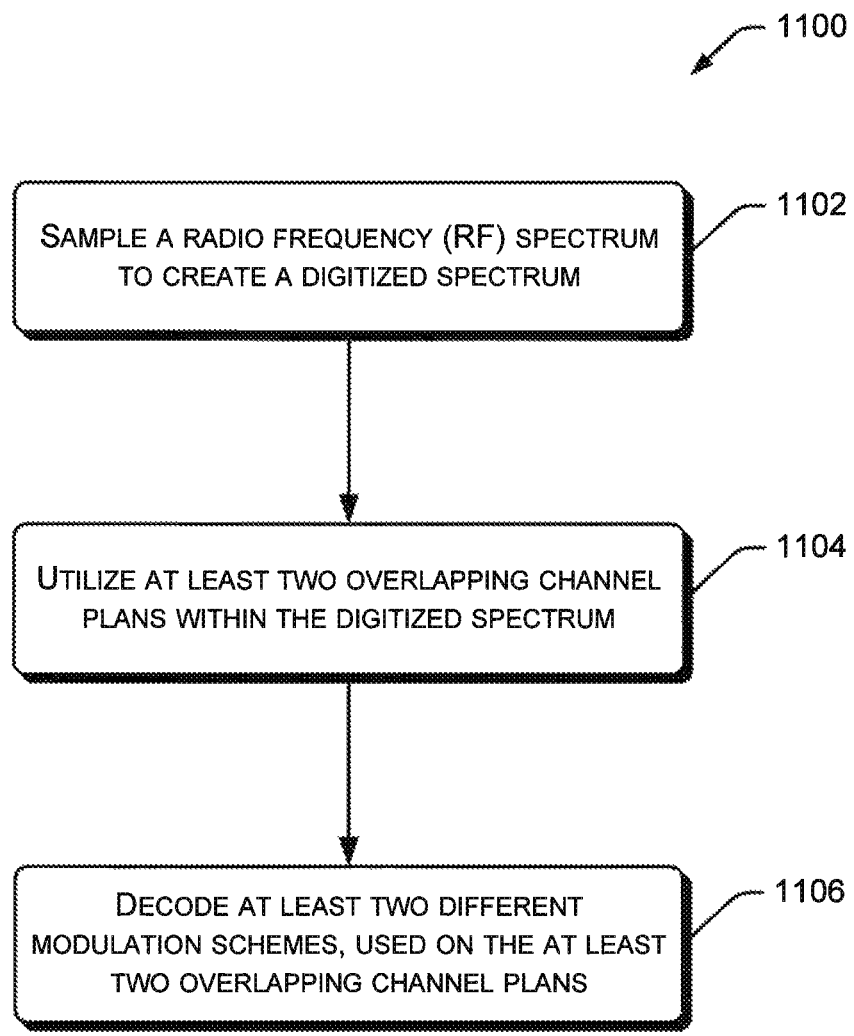
FIG. 11 is a flow diagram showing example operation of a radio configured to simultaneously receive multiple modulation schemes.

FIG. 11 is a flow diagram showing example operation 1100 of a radio configured to simultaneously receive multiple modulation schemes in a single channel. At operation 1102, an RF spectrum is sampled to create a digitized spectrum. For example, the ADC 128 of FIG. 1 may create a digitized representation of an entire radio band (not just one frequency).

At operation 1104, at least two overlapping channel plans within the digital spectrum may be utilized by a multichannel radio. In the examples of FIGS. 2-4, each channel plan may be associated with a different channelizer and a different decoder. In one example, the channel occupied bandwidths, channel locations (center frequencies) and/or channel spacing (e.g., space between adjacent channels) in one channel plan, from among the at least two overlapping channel plans, may be different from bandwidths, locations and/or spacing of channels in another channel plan, from among the at least two overlapping channel plans.

At operation 1106, at least two different modulation schemes are decoded. The at least two different modulation schemes may be utilized by the at least two different channel plans, respectively. Each of the channel plans may overlap at least one other channel plan on at least some portions of the radio spectrum. The modulation schemes associated with the different channel plans may be complimentary, in that modulation schemes used in areas of overlapping spectrum by overlapping channel plans are able to reject the other modulation scheme(s) as noise or interference. In one example, different modulation schemes may be recognized by different decoders (e.g., decoders from the decoder bank 302 of FIG. 3) that are operating in parallel. Thus, two or more paired channelizers and decoders may be associated with two or more modulation schemes, respectively, in a common area of radio spectrum.

Real-Time Radio Spectrum-Assessment Engine

A channel assessment engine and/or associated algorithm may be used to evaluate channels for traffic and/or interference. An example channel assessment engine 1202 is seen in FIG. 12. Within an RF band used by an AMI/AMR network, it may be desirable to locate quiet portions of the spectrum and/or quiet channels defined in the spectrum. To locate such spectrum and/or channels, a multichannel radio receiver may be configured for real-time radio channel assessment. In one example, a radio frequency (RF) front end provides a frequency spectrum which is converted into a digitized spectrum. Within a digital subsystem, resources (e.g., software and/or a hardware device(s)) may analyze digitized spectrum and/or a plurality of channels defined within the spectrum for a packet error rate (PER) at a plurality of power levels and a plurality of modulation schemes. The analysis may result in a required received signal strength indicator (RSSI) that is needed to result in communication having at least a particular read reliability requirement (RRR). Using the required RSSI value(s), endpoints communicating with the multichannel radio may be associated with a channel and/or channel plan, modulation scheme and/or power level that results in the RRR. The analysis may be performed by one or more resources operating in parallel and operating in the background to other communications between the endpoints and the multichannel radio receiver.

In a further example, the channel assessment engine, digital subsystem or other device may create and/or adjust a channel plan in real-time based in part on required RSSI. Endpoint(s) may be assigned to the adjusted channel plans based on their respective RSSI values.

Figure 12:
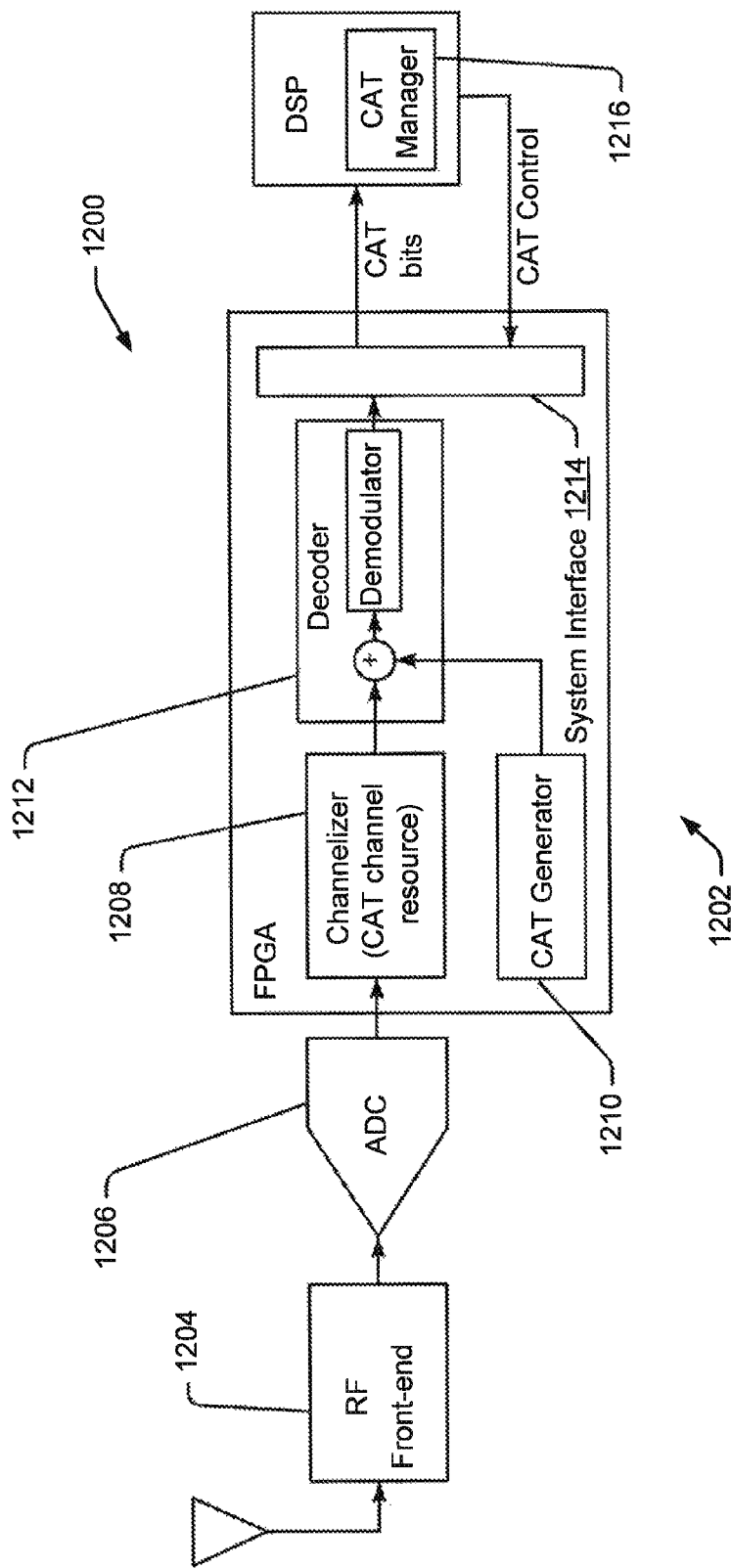
FIG. 12 is a block diagram showing an example radio configured for spectrum assessment.

FIG. 12 shows an example radio 1200. In one aspect, the radio 1200 is configured to assess channels (e.g., for interference), such as by sweeping various channels in a spectrum, varying power of the CAT generator 1210 and calculating a packet error rate (PER). In another aspect, the radio 1200 includes a channel assessment technology (CAT) tool, which may be used to measure RF channel congestion and the required RSSI of the incoming packet(s) for achieving a certain (e.g., desired or required) read reliability.

In the example shown, a CAT engine 1202 may reside within the FPGA 130. The CAT engine 1202 may include CAT channelizer resources, a CAT generator, and a CAT manager, etc. The CAT engine 1202 may be configured to operate in the background, thereby non-intrusively and simultaneously measuring the read reliability for a plurality of channels while the radio is actively receiving normal packet traffic. Such operation allows for the real-time determination of channel plans that support a targeted read reliability performance. Having continuous read reliability channel assessment capability built into the radio architecture ensures that improved and/or optimum channel allocation can be maintained over time by adapting to an evolving interference signature (i.e., the degree to which unwanted signals are present on different channels). This technology is critical for optimal use of the RF spectrum, especially in the unlicensed bands where congestion is a chronic problem.

In one example, separate CAT engines 1202 may be operated for each modulation scheme and channel plan. For example, there could be an independent CAT engine for both a GFSK modulation system and an extended range mode (ERM) modulation system if both were to coexist in that instance. Thus, the architecture of example radio 1200 supports dedicated hardware to instantiate any number of CAT engines 1202 in the FPGA 130. Such construction does not significantly impact resources available to the channelizer bank 300, the decoder bank 302, the DSP 134, etc. Because all may be configured within one or more FPGA, ASIC or other device, each may operate in parallel with the CAT engine 1202.

FIG. 12 shows an example block diagram for the CAT engine 1202. In the example, incoming interference may be received by the RF front-end 1204. The incoming signals may also include valid packets, which may cause collisions with desired packets just like other unwanted interference. Accordingly, the CAT engine 1202 may consider the entire RF signature (including the desired packets, i.e., self-interference) when assessing the channel capacity.

In the example, a single channel resource or channelizer 1208 may be created for each supported modulation scheme, and may be dedicated to the CAT engine 1202. These resources 1208 (only one of which is shown, for drawing clarity) scan across the received radio band in a continuous, repetitive or on-demand manner. The scanning operation may be controlled by the CAT manager 1216, which may be located in the DSP 134 and accessed through a system interface 1214.

The output of a scanning CAT channel may be combined with the CAT signal, which is generated in the CAT generator 1210. The CAT generator 1210 may store a pre-built I/Q signal that has been constructed for a particular or supported modulation scheme(s). It may be combined at baseband in a decoder 1212 where the sample rate is relatively low. Such combination will keep memory size for storing the file to a minimum. In one example, a digital gain/attenuator stage may be used by the CAT generator 1210, which is used for level adjustment. This digital gain/attenuator stage will have sufficient resolution and range to set the output from the sensitivity level to full-scale (16-bits) in 0.25 dB steps. The level of the CAT signal is swept until the targeted PER is found.

The PER for the CAT signal is measured in the DSP, however, resources could also be allocated in the FPGA to determine PER as well. The CAT signal may have a unique or distinguishable ID, enabling differentiation from other incoming valid packets. Since the CAT manager 1216 controls the number of generated CAT signals along with the entire bit definition, it is a straightforward process to measure the PER.

The CAT manager 1216 (which may be found in the DSP) controls all of the primary processes found in the CAT engine 1300. This includes the processes such as the scanner, generator level, PER measurement, and RSSI recording operation.

The CAT generator provides a CAT signal that is constructed of a representative packet and modulation type. This generator sweeps the level of the CAT signal until finding the required RSSI for achieving the targeted read reliability requirement.

The scanning algorithm may be continuously run, to thereby adapt to endlessly evolving over-the-air interference signatures. The recorded power level is the required RSSI from the endpoint for achieving the targeted PER for that instant in time. In one example, a spectrum with the CAT signal may be overlaid on over-the-air incoming noise/interference. In operation of the algorithm, the CAT signal may originally begin at a level below the radio sensitivity, then incremented in power until the targeted PER is reached. In some applications or environments, noise signatures have a natural periodicity that should be taken into account. Once the periodicity of an environment is understood, statistical processing can be used to achieve the desired confidence intervals for meeting the read reliability goals.

Figure 13:
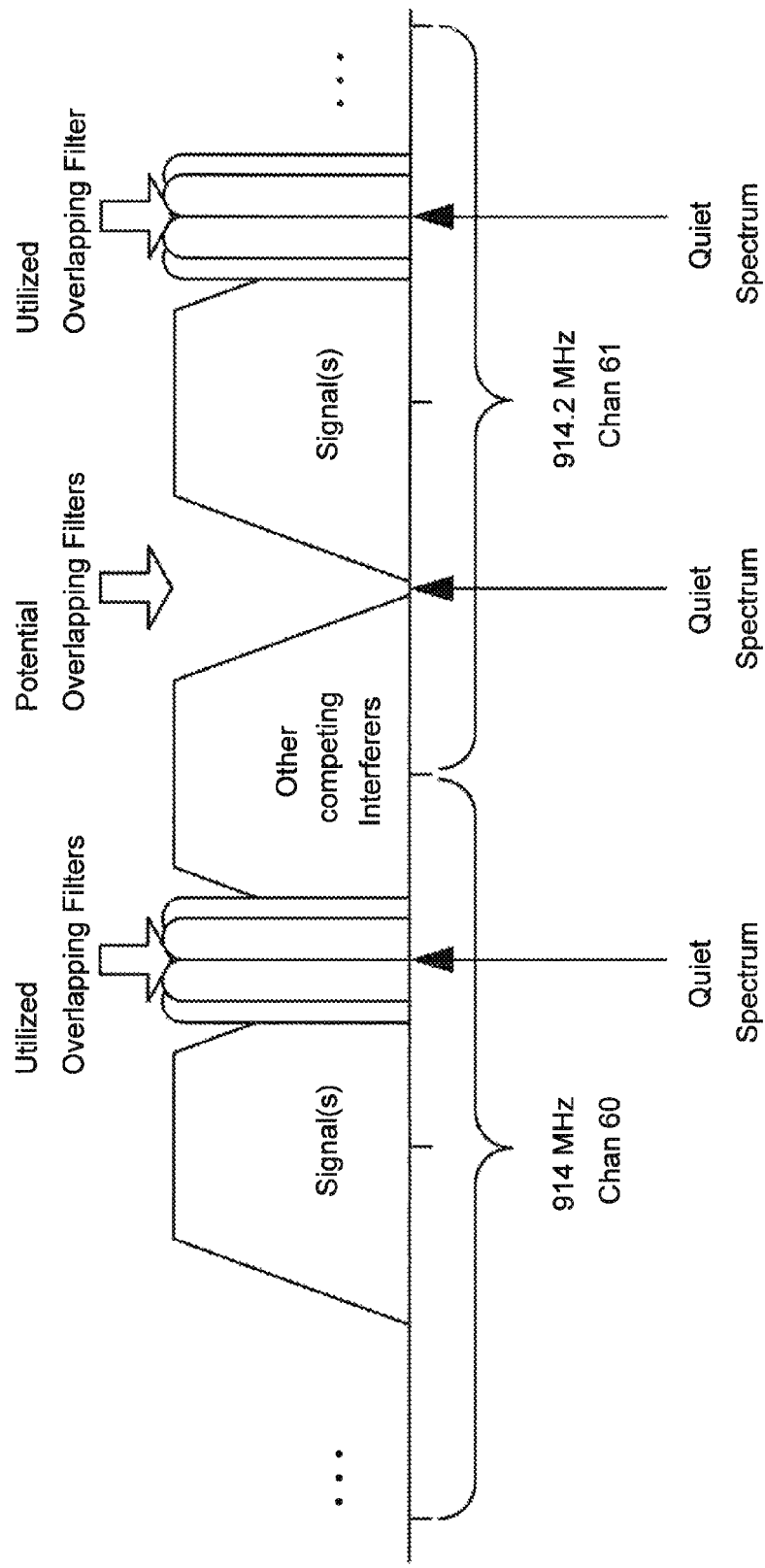
FIG. 13 is a diagram showing a portion of a radio band, and showing techniques (e.g., to exploit spectrum assessment), including placing sub-channels or filters at arbitrary locations to support asymmetrical realizations of channel plans.

FIG. 13 is a diagram showing techniques to exploit spectrum assessment, including placing sub-channels or filters at arbitrary locations to benefit from quiet portions of the spectrum. Such quiet portions of the spectrum may be identified by the CAT engine 1202. The channelizers described herein have the flexibility to place filters over the sub-channels at arbitrary locations, supporting asymmetrical realizations of the sub-channels overlaid on a standard channel plan. In one example, narrowband (e.g., "extended range mode" (ERM)) channels may utilize five overlapping sub-channels that are centered at 50 kHz offsets from a standard channel plan, taking advantage of quiet spectrum nulls. This flexibility allows FPGA resources to be optimally used and tuned to virtually any location in the RF band.

Figure 14:
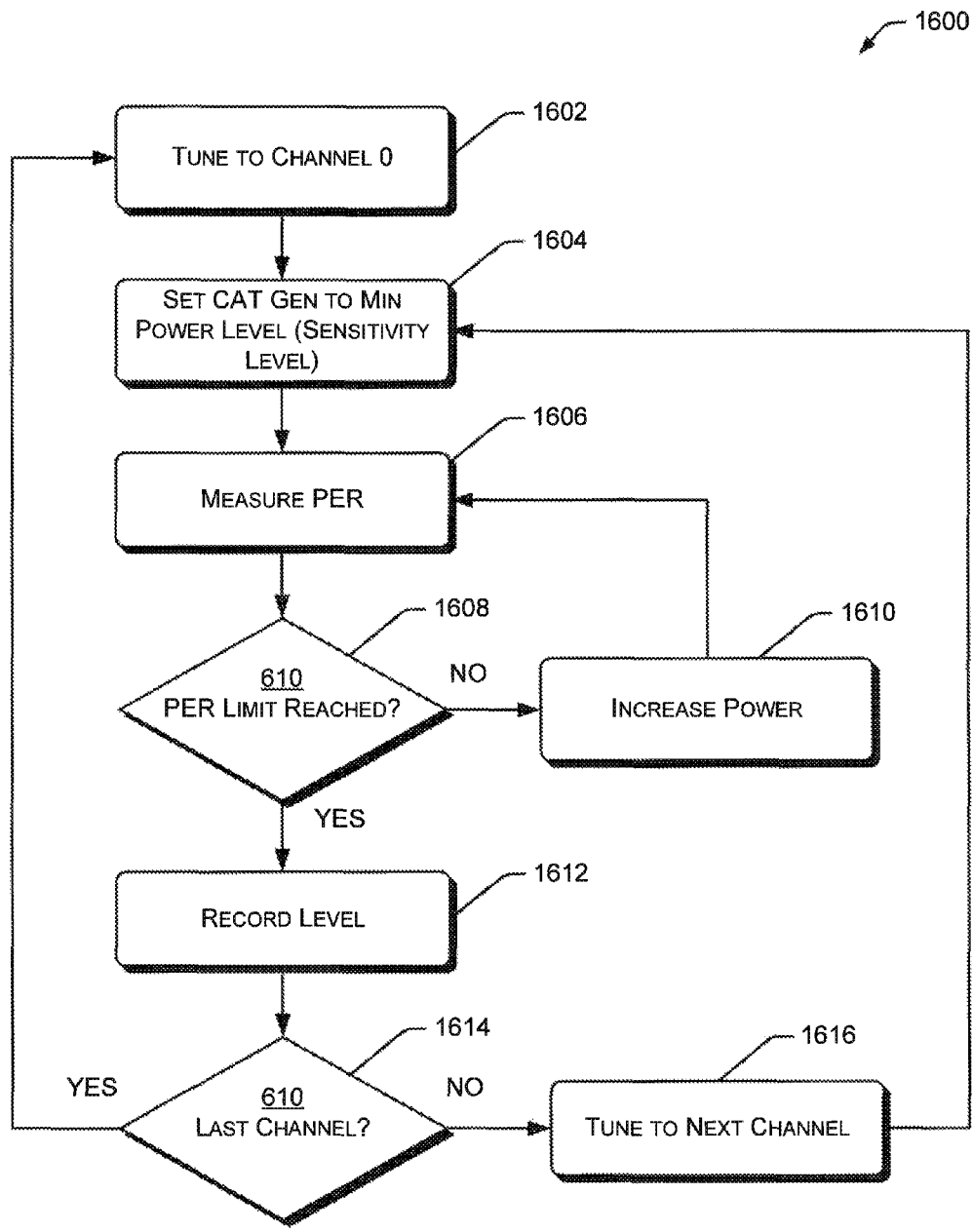
FIG. 14 is a flow diagram showing example operation of a radio to perform real-time channel assessment to assess spectrum for areas of greater and lesser interference and packet error rates.

FIG. 14 shows example operation of a real-time channel assessment algorithm 1400, such as may be used to operate the channel assessment engine 1202 of FIG. 11. At operation 1402, a first channel is tuned. At operation 1404, the channel assessment engine is set to a minimum power level (i.e., a minimum sensitivity level). At operation 1406 the packet error rate is measured, based on the power level set and the channel currently tuned. At operation 1408, it is determined if the PER limit has been reached. If so, at operation 1410, power is increased and at operation 1406 PER measurements are repeated. If the PER limit is not reached, at operation 1412 the PER level is recorded. At operation 1414, it is determined if the last channel has been tested. If so, at operation 1402 the first channel is tuned, and the process repeats. If not, at operation 1416 the next channel is tuned for testing.

Figure 15A:
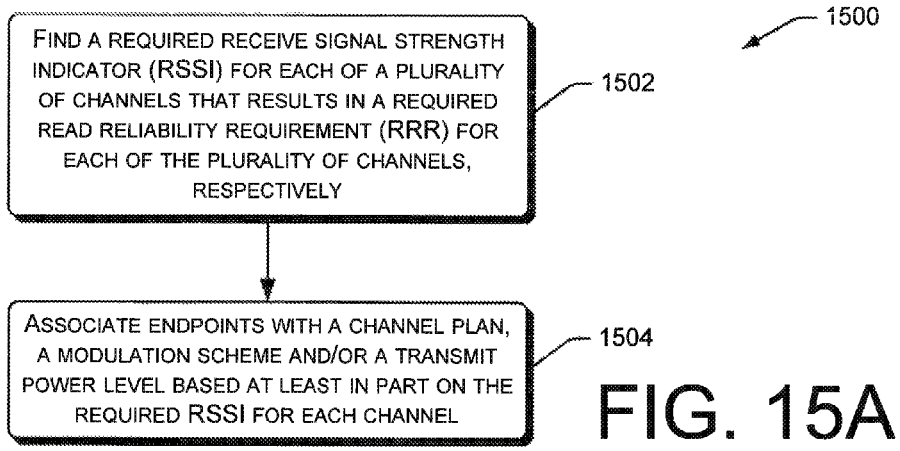
FIGS. 15A-C are flow diagrams showing example operation of a real-time channel assessment algorithm, and showing example association of endpoints and channels.

FIG. 15 are flow diagrams showing example operation 1500 of a radio (e.g., the radio shown in FIG. 12) that performs real-time channel assessment and assesses a spectrum for areas of greater and lesser interference and packet error rates. FIG. 15A describes an example of how RSSI is found and how endpoints may be associated with channels or spectrum in response. At operation 1502, a required receive signal strength indicator (RSSI) for each of a plurality of channels if found. The required RSSI may result in a required read reliability requirement (RRR) for each of the plurality of channels, respectively. In one example, finding the required RSSI for each of a plurality of channels includes measuring a packet error rate (PER) on each of the plurality of channels. The measuring may be performed at a plurality of different power levels. For example, a CAT generator may emulate an endpoint. The CAT generator may be set to a plurality of different power levels and the packet error rate may be measured at each power level. In another example, a PER is measured at each of a plurality of channels in a frequency spectrum and/or for each of a plurality of modulation schemes. The PER may be measured by sequentially or simultaneously tuning to each of the plurality of channels, wherein the channels may be of various widths and spaced according to various distances. At each channel and/or modulation scheme, the measuring may be performed at a plurality of different power levels at which packets are transmitted. Additionally, the measuring of PER may be performed in parallel for each of two or more modulation schemes. The channels (e.g., those associated with different modulation schemes) may be irregular in bandwidth and/or spacing. At operation 1504, channel read reliability data is determined according to channel, power level and/or measured PER information.

At operation 1504, endpoints may be associated with a channel plan, a modulation scheme and/or a transmit power level based at least in part on the required RSSI for each channel and/or the RSSI of each endpoint. Thus, if an RSSI of an endpoint is greater than or equal to a required RSSI of a channel for a particular modulation scheme, it may be assigned to that channel, and/or its power level may be adjusted. In one example, the weakest, most distant, etc., endpoints may be assigned to channels that have the least noise which is determined by achieving the targeted PER at the lowest CAT generator power levels. In contrast, endpoints with stronger signals may be assigned to channels achieving the targeted PER at the highest CAT generator power levels.

In one example, the finding of the required RSSI (operation 1502) and the associating of endpoints (operation 1504) may be performed in a repetitive manner using updated data from a digitized representation of the frequency spectrum.

Figure 15B:
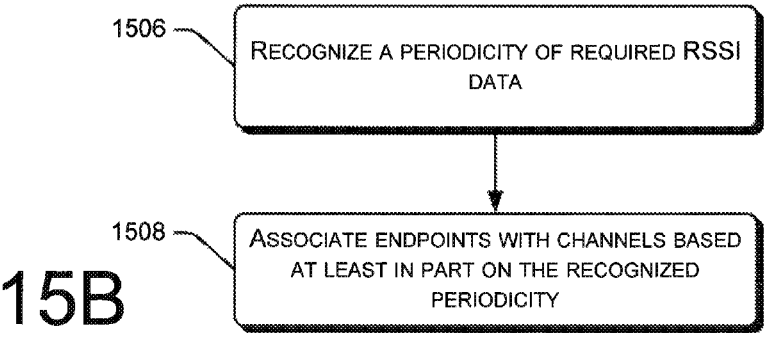

FIG. 15B describes an example of how periodicity (e.g., or interference and/or possibly noise) may be recognized and how endpoints may be associated with channels or spectrum in response. At operation 1506, a periodicity of required RSSI data may be recognized. Depending on the environment, channel interference may be periodic and/or predictable.

Thus, changes in the environment of a channel may be predicted. At operation 1508, endpoints may be assigned to channels based in part on the recognized periodicity. Alternatively or additionally, endpoints may be assigned to a modulation scheme that performed better in a parallel performance comparison (e.g., operation 1502).

Figure 15C:
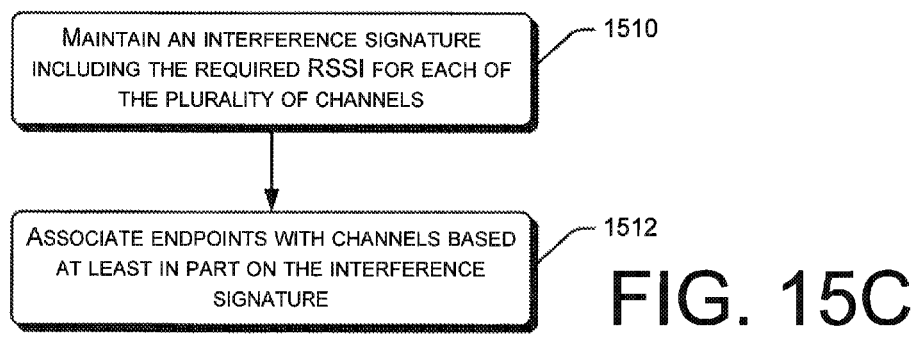

FIG. 15C describes an example of interference signature maintenance, and how endpoints may be associated with channels or spectrum in response. At operation 1510, an interference signature may be maintained, including the required RSSI for each of the plurality of channels and/or modulation schemes. The interference signature may include information on the strength and nature of interference or traffic on a plurality of channels across a radio band. At operation 1512, endpoints may be assigned to channels based in part on the interference signature.

Radio with A-to-D Sample Rate Decoupled from Digital Subsystem

Known radios have used RF front ends and digital subsystems that are closely related. In such radios, the rate of sampling of an analog to digital converter (ADC) is coupled to downstream processing. Accordingly, a channel plan may force specific requirements on the ADC, which in turn may limit radio flexibility. As discussed herein, a multi-channel radio architecture decouples the ADC sample rate from the downstream processing. As a result of the decoupling, a specific and/or desired channel plan does not result in a requirement on the ADC sample rate. The radio architecture provides flexibility of channel placement (i.e., channels do not have to be placed at even intervals) and channel width (i.e., channels do not have to be of similar width). In one example, a multi-channel radio may derive a channel plan independent of the ADC sample rate by using digital I/Q mixing (e.g., mixing of a complex signal containing both real and imaginary components), efficient re-sampling and filtering techniques. The multichannel radio receiver may include a radio frequency (RF) subsystem and a digital subsystem. The RF subsystem may be configured to provide analog information associated with a radio band to the ADC. The ADC samples the analog input and sends digital output to the digital subsystem. The digital subsystem may be configured with one or more channelizers and one or more decoders. A channelizer within the digital subsystem may filter and re-sample the digital output to result in a channel plan having a desired bandwidth and a desired sample rate. The sample rate may be selected for compatibility with a decoder. The decoder may have design specifications based in part on a modulation scheme to be decoded. The design specifications may indicate the desired sample rate to be provided by the channelizer.

Figure 16:
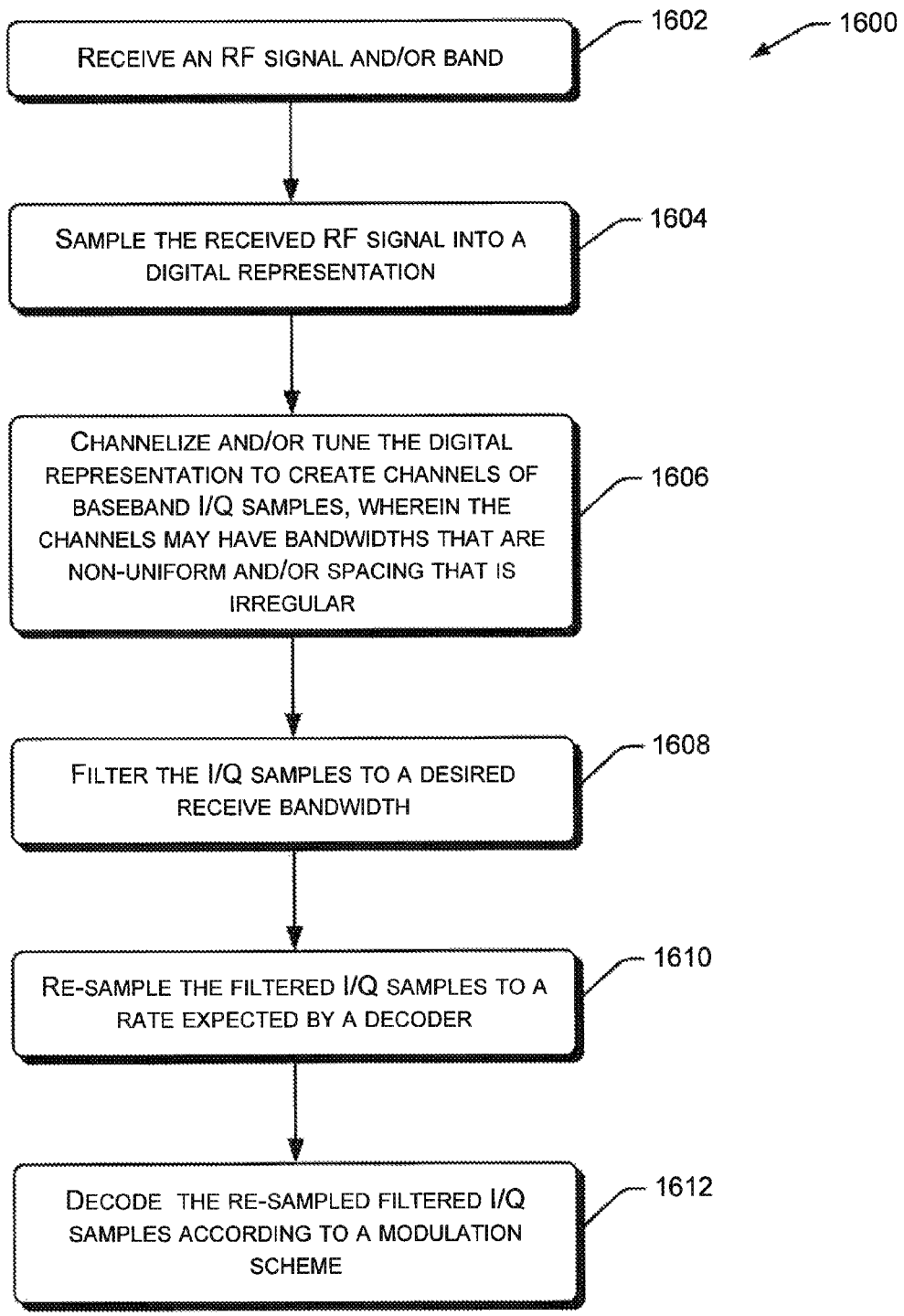
FIG. 16 is a flow diagram showing example operation of a multichannel radio that decouples an analog-to-digital sample rate from downstream processing (e.g., by the digital subsystem).

FIG. 16 is a flow diagram showing example operation 1600 of a radio that decouples the ADC sample rate from downstream processing, thereby allowing for significant design advantages and flexibility. At operation 1602, an RF signal is received (e.g., by the RF subsystem 124 of FIG. 1) and converted into a discrete digital representation (e.g., in the time domain by the ADC 128). At operation 1604, the received RF signal may be sampled into a discrete digital representation (e.g., in the time domain). In the example of FIG. 1, the sampling may be performed by ADC 128.

At operation 1606, the discrete time digital representation is channelized to create parallel channels of baseband I/Q samples. In one example, the channels may have widths that are non-uniform and/or spacing that is irregular. In another example, the channels may overlap to provide contiguous coverage over a span of frequency drift of users (e.g., endpoints) of the channels, e.g., over a span over which frequencies used by endpoints transmitting to the radio may drift. In the examples of FIGS. 2-4, the channelizing may be performed by a plurality of channelizers, each channelizer associated with a channel plan, a resample rate, and a modulation scheme. In other examples, the channels may be regular in bandwidth and spacing.

At operation 1608, the I/Q samples may be filtered to a desired receive bandwidth. The filtering may be performed by a FIR filter, such as filter 408, as seen in FIGS. 4 and 7.

At operation 1610, the filtered I/Q samples may be re-sampled to a rate expected by a decoder. In the example of FIG. 4, the re-sampling may be performed by the up-sampler 406 and the down-sampler 410.

At operation 1612, the re-sampled filtered I/Q samples are decoded according to a modulation scheme associated with a decoder. In the examples of FIGS. 2-4, the decoding is performed by a plurality of decoders. In the example shown, each decoder may be associated with at least one channelizer. The associated channelizer may have a resample rate that is compatible with the decoder and its modulation scheme.

FSK/MSK Decoder

Figure 17:
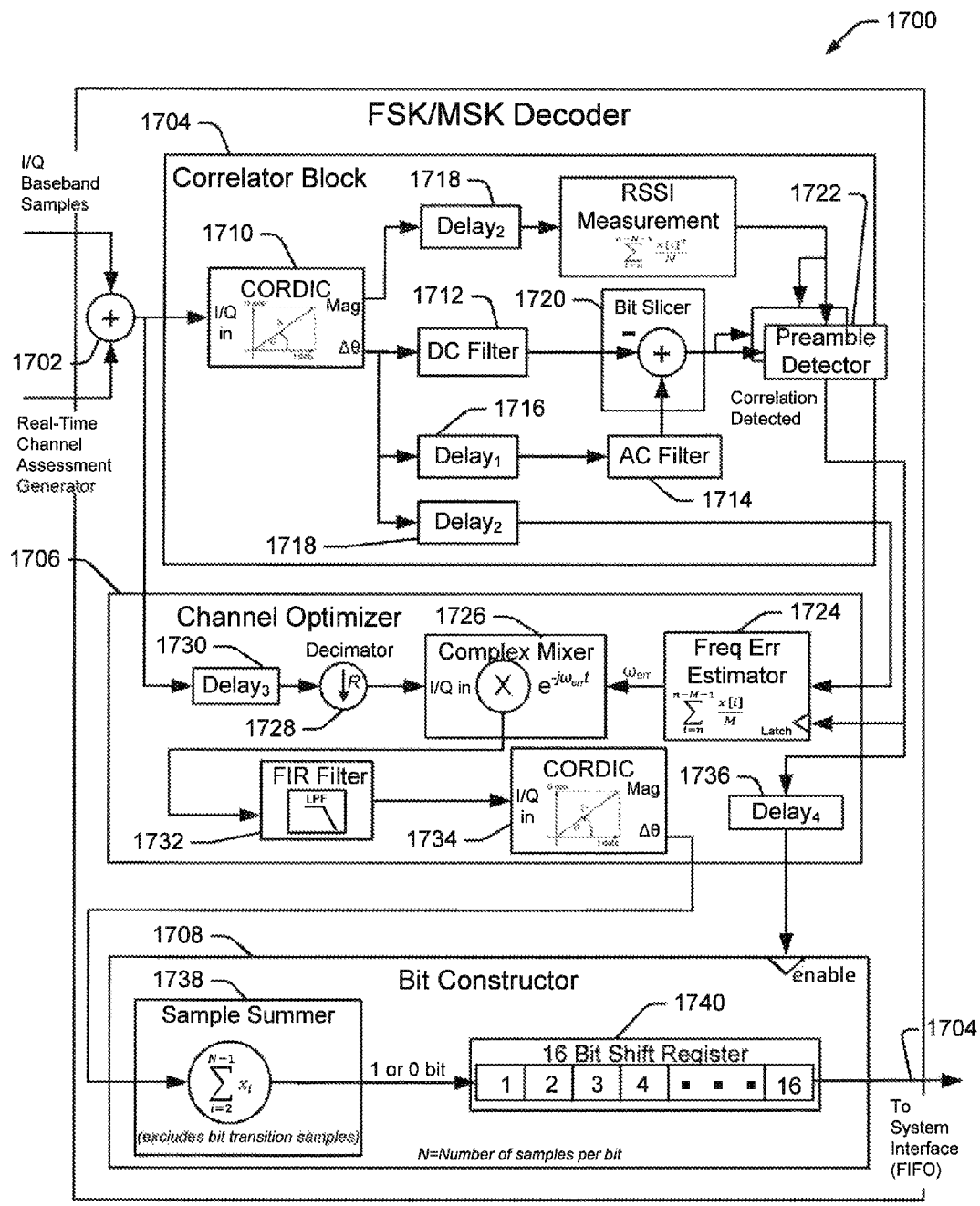
FIG. 17 shows detail of a decoder, for purposes of an example configured according to frequency-shift keying (FSK)/minimum shift keying (MSK).

FIG. 17 shows detail of an example FSK decoder 1700 that demodulates a plurality of modulation schemes, such as FSK/MSK. In one example, the decoder is configured to operate close to the radio noise floor. A correlation value may be constantly updated, in an effort to correlate and/or match the calculated correlation value of a preamble of a packet to a signature. A low clamp value may act as a floor to which a calculated correlation value is set, if the calculated value is less than the low clamp value. If a correlation threshold is exceeded, then the correlation value is examined to determine it is a peak value. If the peak is found, power of the preamble is compared to a power threshold that is relative to the radio noise floor. If the power threshold is exceeded, positive correlation is detected and the payload of the packet may be decoded. A channel optimizer is used to remove the frequency misalignment. This enables the use of a filter that is approximately equal to the occupied bandwidth of the incoming signal, further rejecting noise and interference.

Each decoder found in the decoder bank (e.g., decoder bank 204 in the example of FIG. 3 and decoder bank 302 in the example of FIG. 3) may support a number of interfaces. The decoder 1700 may support complex PQ inputs that contain the sampled baseband data from the output of a channelizer (e.g., channelizers 206-210 of the example of FIG. 2 or channelizers 308-314 in the example of FIG. 3) within a channelizer bank. In one example, both the I and Q inputs may each contain 16-bits. Each decoder found in the decoder bank may be paired with a channelizer found in the channelizer bank. Thus, the channelizer may have an appropriate sample rate and baseband bandwidth to match the requirements for a specific instance of a decoder 1700. Since I/Q signals can simultaneously include both AM and FM signals, virtually any modulation scheme can be realized in this architecture.

The example FSK decoder 1700 represents a specific decoder instance used for demodulating any FSK/GFSK/MSK/GMSK modulated signal. This specific design assumes the incoming signal is non-return to zero (NRZ) encoded. This decoder receives the baseband I/Q samples from the channelizer block. These input samples have been filtered and re-sampled to the requirements of the decoder. This allows the decoder to be scaled for efficient operation at virtually any baud rate and deviation.

The example decoder 1700 may support multiple clocks. The clocks may be generated in the system interface block (e.g., systems interface 304 of FIG. 3) according to requirements of a particular decoder. The decoder may support a channel assessment technology (CAT) generator input (e.g., CAT generator 324 provides an input to decoder bank 302 in FIG. 3). Each decoder found in the decoder bank may have a summing node (e.g., node 1702 of FIG. 17) allowing the CAT generator 324 to be combined with the I/Q input signal.

The decoder 1700 may support bit output 1704 to the system interface (e.g., to a first-in, first-out (FIFO) buffer). In particular, the output 1704 of the decoder 1700 will be decoded bits. These bits may be placed in 16-bit words into the output interface 328 found in the system interface block 304 (e.g., FIFO output, seen in FIG. 3). There may be header information included with the 16-bit words that provides supporting information for downstream packet reconstruction and link maintenance. Packet reconstruction may be managed by the DSP processor 134 that may be located external to the FPGA 130 (e.g., as shown in FIG. 1). The decoder may support control registers. Each decoder may have memory mapped control registers. These registers are connected to the command interface 330 found in the system interface block 304 (see FIG. 3). The actual control of the decoders in the decoder bank may be managed by a DSP 134 that is located external to the FPGA 130 (e.g., as seen in FIG. 1).

Each decoder found in the decoder bank may support the following services. The decoder may support a CAT signal summing node for input to the CAT engine or generator (the CAT generator, manager, etc. are shown in greater detail in FIG. 12). The decoder may support a frequency estimator (discussed more fully with respect to FIG. 21). In one example, the frequency error estimator may be used to offset a frequency of a downlink signal to align with the frequency error of a device transmitting an uplink signal to the radio. The frequency error estimator found in the decoder may be used by the transmitter to alter a frequency used in transmission to downstream devices (e.g., devices 108-120 of FIG. 1) to align with the frequency used by those devices. The decoder may support channel power measurement. Channel power measurement may determine the receive signal strength indicator (RSSI) of the device transmitting to the radio. This level will be used by the CAT engine 1202 (as seen in FIG. 12) for determining the best channel plan for the receiving a signal from the device. The decoder may correlate to a modulation scheme and demodulate any valid received signal. The output of the decoder may be decoded bits. The decoder may provide control registers for external configuration control. The decoder may have a summing node that may be used for injecting the CAT signal. In some embodiments, only one decoder (that is, one channel from a channelizer) will be utilized to support this feature. The remaining instances of this decoder may have this mode disabled.

FIG. 17 shows example details of an FSK decoder 1700, which may be configured for operation within a decoder bank (e.g., decoder bank 204 of FIG. 2). In the example shown, the decoder 1700 includes a correlator block 1704, a channel optimizer block 1706 and a bit constructor block 1708. The correlator block 1704 is configured to recognize and or correlate a received signal with a preamble of a packet. The channel optimizer block 1706 is configured to condition data according to frequency error and correction, sample rate, channel width and other factors. The bit constructor 1708 is configured to convert conditioned data into actual digital ones and zeros.

Correlator Block

The primary role of the correlator block 1704 is to detect if a known preamble signature exists in a received signal and synchronize the decoder 1700 to that packet. Since the incoming signal may include noise and interference along with the desired preamble signature, the correlator block 1704 is actually determining a probability of the existence of the preamble. The correlator block 1704 also provides frequency information that is used in the channel optimizer block 1706.

The correlator block 1704 includes a CORDIC block 1710, a DC filter 1712, an AC filter 1714, first and second delay blocks 1716, 1718, a bit slicer 1720, and preamble detectors 1722. In one example, the correlator block 1704 is configured to virtually eliminate false detects while effectively correlating to a signal that may be only 2 dB above the radio noise floor. Example performance is achieved in part by utilizing a sync word prior to the preamble to train the correlator block 1704.

In the example shown, the decoder 1700 is configured for GFSK/GMSK modulation. However, a decoder to decode virtually any modulation protocol could be derived from this architecture, including low baud rate to high baud rate systems and advanced modulation schemes. Each realized decoder may be designed to support standard interfaces and/or mandatory services. Such a design allows the various blocks in the radio architecture described herein to seamlessly interoperate.

CORDIC Block

The CORDIC block 1710 (for COordinate Rotation DIgital Computer) takes the incoming streaming complex I/Q samples and calculates the hyperbolic equivalent. More specifically, it converts the samples to an amplitude and delta phase stream. CORDIC is an efficient algorithm that can be implemented with addition, subtraction, bit shifting, and table lookup operations, which are well-suited for the FPGA technology. The I/Q samples sent to the CORDIC may be formatted in Cartesian coordinates. These coordinates may be converted into polar coordinates before they are processed in downstream blocks.

In the example of FIG. 17, the CORDIC 1710 utilizes a relationship between Cartesian (I/Q) and polar coordinates A∠θ. The magnitude (A) is the hypotenuse of the right triangle, while the phase (θ) is the angle between the hypotenuse (A) and I vector.

The challenge with phase is handling the transitions crossing the +180° (+π) to −180° (−π) boundaries. The example mathematical operations for determining the polar coordinate are found in Equation (9).

$$A = \sqrt{I^2 + Q^2} \qquad \text{Equation (9)}$$

$$\theta = \begin{cases} \tan^{-1}\left(\frac{Q}{I}\right), & I > 0 \\ \tan^{-1}\left(\frac{Q}{I}\right) + \pi, & I < 0 \text{ and } Q \geq 0 \\ \tan^{-1}\left(\frac{Q}{I}\right) - \pi, & I < 0 \text{ and } Q < 0 \\ +\frac{\pi}{2}, & I = 0 \text{ and } Q > 0 \\ -\frac{\pi}{2}, & I = 0 \text{ and } Q < 0 \\ 0, & I = 0 \text{ and } Q = 0 \end{cases}$$

where,
  A (volts), magnitude; and
  θ (radians), angle.

The CORDIC block 1710 will unwrap the phase (handle the boundary conditions). The downstream blocks may then process the frequency trajectory. The phase trajectory may be used for frequency discrimination. Frequency (radians/sec) can be determined from the phase trajectory using Equation (10).

$$freq = \frac{d\theta}{dt},$$

for continuous time
it can also be represented as $$freq = \frac{\Delta\theta}{\Delta sample},$$

for discrete samples
where,
d$\theta$ (radians), derivative of phase;
t (seconds), time;
$\Delta\theta$ (radians), change in phase; and
$\Delta$sample sample period.

Therefore, the CORDIC block 1710 may return the change in phase between each sample ($\Delta\theta$) of the unwrapped phase trajectory to the correlator block 1704, which is equivalent to the frequency content of the signal.

The amplitude output of the CORDIC block may be used for received signal strength indicator (RSSI) measurement. Since the incoming I/Q samples have been filtered to the desired channel bandwidth, the RSSI measurement is essentially a channel power measurement.

The output of the DC filter 1712 in the correlator block 1704 may contain a running average of the incoming signal. The DC filter 1712 determines a short term average of the signal to be used by the bit slicer 1720 for preamble detection. Because the integration period of the DC filter 1712 may be assumed to be shorter than the length of the preamble, it may be used as a rough estimate for carrier frequency error for GFSK. The implementation of the DC filter 1712 may be an infinite impulse response (IIR) filter which is described in Equation (11).

$$y_k = \frac{(x_k + A_o * y_{k-1})}{B_o} \quad \text{Equation (11)}$$

where,
y Output bit stream;
x Input bit stream;
K Bit index;
$A_o$ (integer), Numerator Coefficient; and
$B_o$ (integer), Denominator Coefficient.

The GFKS modulation assumes a non-return to zero (NRZ) encoding. Therefore, the GFSK preamble has been intentionally designed to have an equal number of ones and zeros in the signature. This will result in a DC bias proportional to the carrier frequency error. In one example, $A_o$=127, $B_o$=128 offers reasonable performance for most modulation configurations.

Delay Blocks

There are several delay blocks found in the decoder design. These delay blocks are used to keep the signal paths aligned. Such alignment is essential for determining the beginning of the packet for the various processing paths. The master synchronization signal is the "valid preamble detection" signal that is sourced from the preamble detector.

Figure 18:
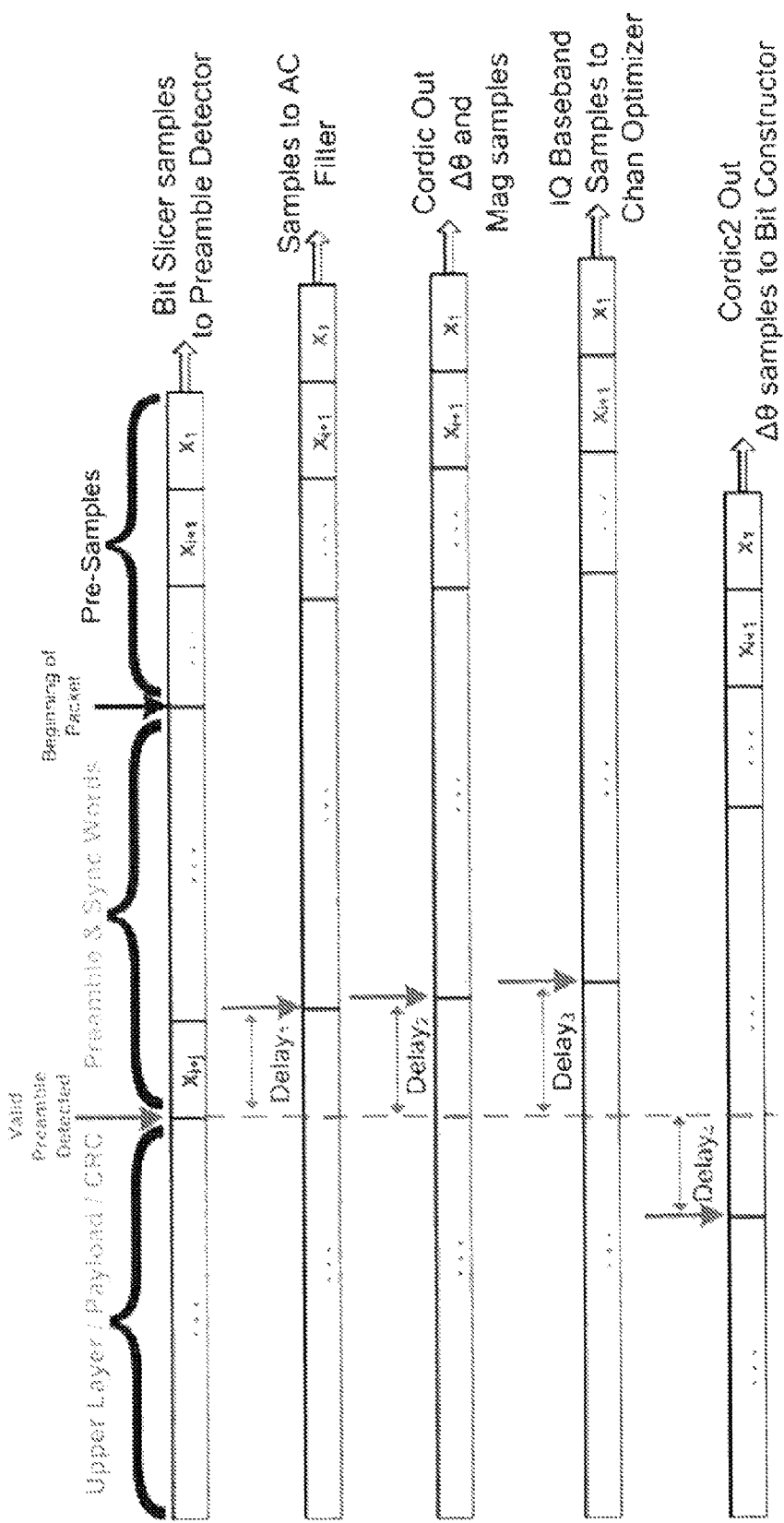
FIG. 18 is a diagram showing example use of delay blocks in a decoder.

FIG. 18 illustrates an example of the various delay elements used to derive the location for the beginning of the payload by utilizing the "valid preamble detection" signal. The "valid preamble detection" will identify the location of the end of the preamble, which is also the beginning of the upper layer fields. As seen in FIG. 18, delay-4 occurs on the left side of the "valid preamble detection" signal, which is equivalent to a negative delay on the output samples of the Cordic 1710, or a positive delay on the "valid preamble detection" signal.

Delay 1

The delay block 1716 is used to provide delay between DC filter 1712 and the AC filter 1714 paths. The DC filter needs to provide an estimate of the carrier frequency error and therefore needs to process a signal ahead of the AC filter 1714. Delay 1716 provides the necessary delay to the AC filter path allowing the DC path to settle, which is necessary for the operation of the downstream bit slicer 1720. The delay 1716 is calculated from Equation (12).

$$Delay_1 = \frac{bits}{bitrate} \quad \text{Equation (12)}$$

where,
$Delay_1$ (sec), delay time, may be converted to sample delay in the FPGA;
Bits (constant) number of running bits used to estimate frequency error (typically 6 bits); and
bitrate (Hz), bitrate of the receiving signal.

Delay 2

The delay block 1718 is used to provide alignment of the output of the CORDIC block to the "correlation detected" signal coming from the preamble detector 1722. This is important for keeping both the RSSI measurement and the channel optimizer 1706 aligned with the received packet. The delay 1718 is calculated from Equation (13).

$$Delay_2 = Delay_1 + DelayAcFilter \quad \text{Equation (13)}$$

where,
$Delay_2$ (sec), Delay to align the frequency error estimator to a valid detected preamble
$Delay_1$ (sec), Delay block found in correlator block
DelayAcFilter (sec), Delay of the AC Filter found in the correlator block AC Filter The AC filter 1714 may have a much quicker response than the DC filter 1712, allowing the clean (smooth) tracking of the incoming signal. In one example, the sample rate for the incoming data may be 16× bit rate. The AC filter 1714 integrates this data to track the incoming oversampled bit stream. This filter may be implemented as an IIR filter, and may operate according to a transfer function that is described in Equation (14).

$$y_k = \frac{(x_k + A_o * y_{k-1})}{B_o} \quad \text{Equation (14)}$$

where,
y Output bit stream;
x Input bit stream;
K Bit index;
$A_o$ (integer), Numerator Coefficient; and
$B_o$ (integer), Denominator Coefficient.

The AC filter 1714 is actually operating on the frequency trajectory content of the signal ($\Delta\theta$). When selecting the coefficients for the AC filter 1714, it may be important to minimize the distortion of the primary lobe.

The delay of the AC filter 1714 is a function of the coefficients. Since the AC filter 1714 is an IIR, the filter will have non-linear group delay. The delay value may be important for determining an appropriate delay for several delay blocks found in the decoder.

In one example, spectrum utilization by the AC filter is relatively insensitive to modulation index. Therefore, the coefficients may be configured to optimize the performance based on the oversample rate, modulation mode, and the Gaussian filter beta which drives the characteristics of the main lobe.

The delay of the AC filter is a function of the coefficients. Since the AC filter may be an IIR, the filter will have non-linear group delay. Therefore, the average delay may be based on coefficients and may depend on how much filtering is desired and how much oversampling will be performed. This value assists in the determination of an appropriate delay for several delay blocks found in the decoder.

$$PreambleWeights_i = \begin{cases} \begin{rcases} +1, \text{ if } preamble_1 = 0 \\ -1, \text{ if } preamble_1 = 1 \end{rcases} & \text{for } i = 1 \\ \begin{rcases} -1, \text{ if } preamble_N = 0 \\ +1, \text{ if } preamble_N = 1 \end{rcases} & \text{for } i = N+1 \\ \begin{rcases} 0, \text{ if } preamble_{i-1} = preamble_i \\ +2, \text{ if } preamble_{i-1} > preamble_i \\ -2, \text{ if } preamble_{i-1} > preamble_i \end{rcases} & \text{for } 2 \le i \le N \end{cases} \quad \text{Equation (15)}$$

where,
$preamble_x$ (0 or 1) Preamble chip value found at the $x^{th}$ location
N Total number of preamble chips The value found in the correlator (CorVal) may be continuously accumulating based on the alignment of the weighted taps relative to the incoming bit stream that is fed from the bit slicer. In the example, CorVal is accumulated based on the following equation:

$$CorVal = CorVal + \sum_{i=0}^{N} \begin{cases} \begin{rcases} +PreambleWeights_i, \text{ if } bitSlicer_j = 1 \\ -PreambleWeights_i, \text{ if } bitSlicer_j = 0 \end{rcases} & \text{for } i = 0 \\ \begin{rcases} +PreambleWeights_{i+1}, \text{ if } bitSlicer_{j+i+osRate} = preamble_i \\ -PreambleWeights_{i+1}, \text{ if } bitSlicer_{j+i+osRate} \ne preamble_i \end{rcases} & \text{for } 1 \le i \le N \end{cases} \quad \text{Equation (16)}$$

where,
$preamble_x$ (0 or 1) preamble chip value found at the $x^{th}$ location;
$PreambleWeights_x$ weighted preamble value found at the $x^{th}$ location;
$bitSlicer_x$ (0 or 1) bit slicer value found at the $x^{th}$ location;
j (integer) index of the continuous stream of sliced bits;
N total number of preamble chips.

Example Correlation Value Calculation

Figure 19:
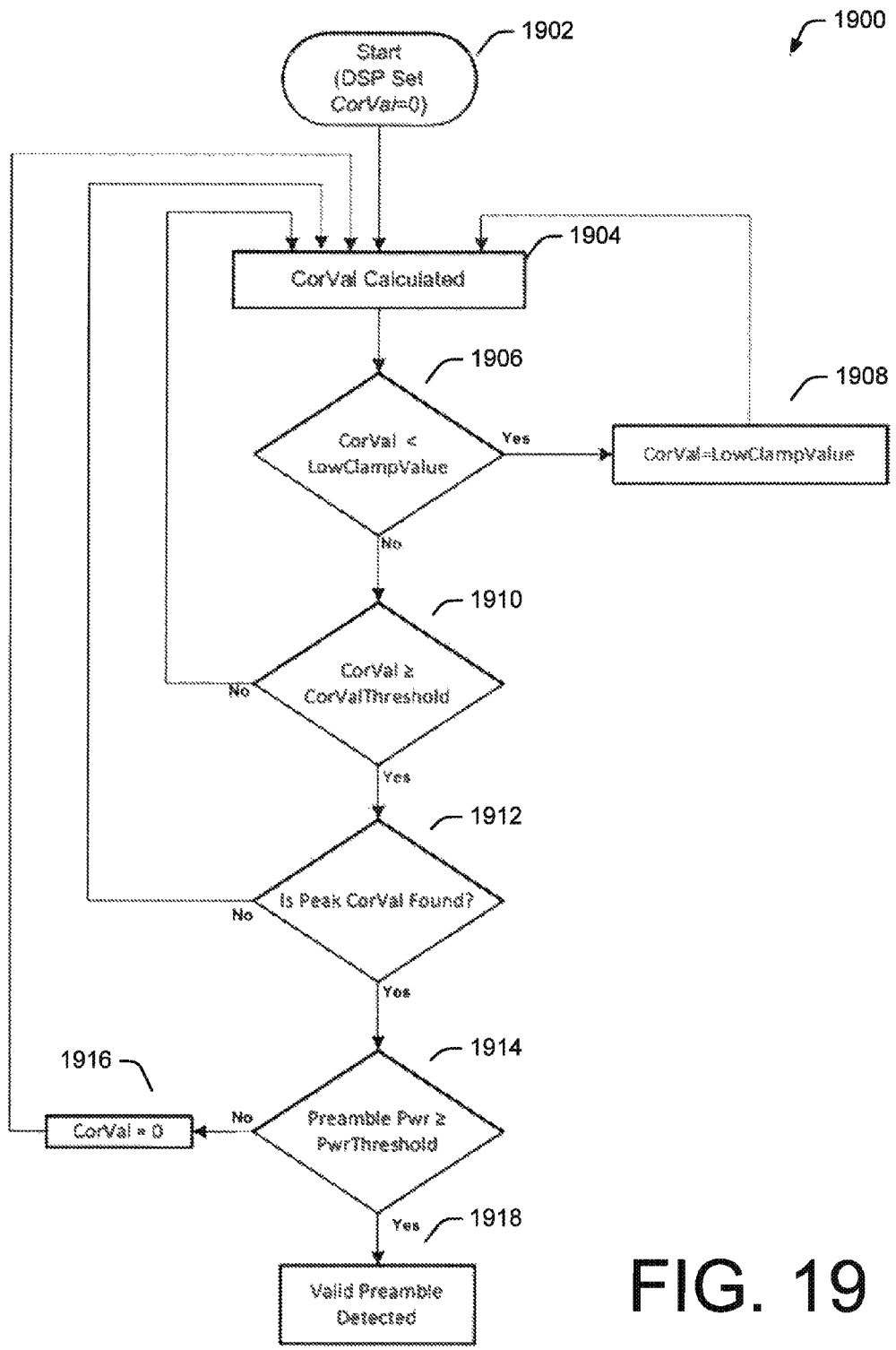
FIG. 19 is a flow diagram showing example detection and/or correlation between a preamble of a packet and a known preamble signature.

FIG. 19 shows an example of the calculation of the variable and/or term: CorVal. In the example, CorVal will continuously accumulate. However, there are several events that will change the value of CorVal. As seen in FIG. 19, once the correlator reaches a certain threshold, it is qualified by the RSSI power measurement. This ensures a real signal is present. This technique dramatically reduces the likelihood of false detections and allows for the use of lower CorValThreshold values. This technique may be used to successfully detect valid signals that are received just above the noise floor of the radio.

A couple of techniques may be used to keep the CorVal from wandering outside of a reasonable operating range. If the CorVal ever exceeds the CorValThreshold and the RSSI PwrThreshold level is not exceeded, the CorVal may be set to zero. Also, if the CorVal drops too low, it may be automatically clamped to the LowClampValue. Keeping the seed CorVal within this range may dramatically improve the reliability of detecting a real packet when it arrives.

The thresholds and clamp values are programmable, allowing them to be tailored to the specific preamble requirements. Since the received signal is always combined with noise and interference, the CorValThreshold value should always be set lower than 100% correlation. All threshold values are empirically determined to maximize receiver sensitivity while minimizing false detections. Once detection has occurred, the Bit Slicer The bit slicer 1720 may take the average signal integrated over a larger bit period from the DC filter path and compare it to the smoothed data from the AC filter path to effectively determine whether the bit is a one or zero. The bit detection is sent to the preamble detector 1722.

Preamble Detector

The correlator block 1704 can contain multiple preamble detectors 1722. The desired preamble signature is loaded into a preamble detector 1722 from the DSP 134. This allows configuring the decoder 1700 to update or add new preambles if needed. The preamble detector 1722 may actually operate on chips. Since Manchester encoding may have 2 cycles per bit, there are 2 chips per bit for OOK. Currently, GFSK utilizes only 1 chip per bit.

In a first example, the preamble detector 1722 may be utilized as a correlator (i.e., it correlates data to a preamble of a packet that indicates a particular protocol). Once the correlator reaches a certain threshold, a correlation detection signal is generated. This threshold may be programmable. Since the average signal from the DC filter 1712 is a rough estimate that is only over part of the preamble, the threshold for the preamble detector 1722 may be intentionally set to a value lower than 100%. Once detection has occurred, the correlation detection signal is used to enable the channel optimizer block 1706 and bit constructor block 1708. The current threshold values may be determined experimentally to maximize receiver sensitivity. The threshold value may be selected so that false correlations are minimized; however, some preamble detection errors may be tolerated.

In a second example, the preamble detector 1722 may be utilized as a correlator that is operating on weighted taps of the differentially encoded preamble word. There may be one more weighted tap than the number of bits found in preamble.

correlation detection signal is used to enable the Channel Optimizer and Bit Constructor Blocks.

In the example of FIG. 19, at operation 1902, the variable CorVal is set to zero. At operation 1904, the CorVal is calculated, such as by operation of Equation 16. At operation 1906, CorVal is compared to the low clamp value. If CorVal is less than the low clamp value, then at operation 1908 the CorVal is set to the low clamp value. If CorVal is more than the low clamp value, then at operation 1910, the CorVal is compared to the CorVal threshold value. If CorVal is less than the CorVal threshold value, then CorVal is recalculated at operation 1904. If CorVal is more than the CorVal threshold value, then at operation 1912 it is determined if a peak is found. If there is no peak, then operation 1904 is repeated. If there is a peak, then at operation 1914 the power of the preamble is compared to a power threshold. The power threshold may be based in part on, or relative to, the noise floor. If the power of the preamble is less than the power threshold, then CorVal is reset at operation 1916 and recalculated at operation 1904. If the power of the preamble is greater than the power threshold, then a valid preamble is detected.

RSSI and Channel Power Measurements

The received signal strength indicator (RSSI) can easily be measured from the magnitude data found at the output of the CORDIC block 1710. Since this signal has been filtered by the upstream digital receiver, the channel power can also be easily calculated. This measurement can be triggered from the 'valid correlation' signal, which allows for a coherent power measurement to be taken on an incoming packet. Example calculations for both the RSSI and channel power measurements are shown in Equation (17).

$$RSSI = \sum_{i=1}^{N} \frac{Mag_i^2}{N}$$ Equation (17)

Channel Power =

$$10\log_{10}(RSSI*1000) + CalFactor \ dBm$$

where,
RSSI Received Signal Strength Indication;
Mag (samples) Magnitude data from the CORDIC output;
N Number of samples;
Channel Power (dBm) Power in the channel bandwidth;
CalFactor (dBm) Calibration that is generated in the factory.

Figure 20:
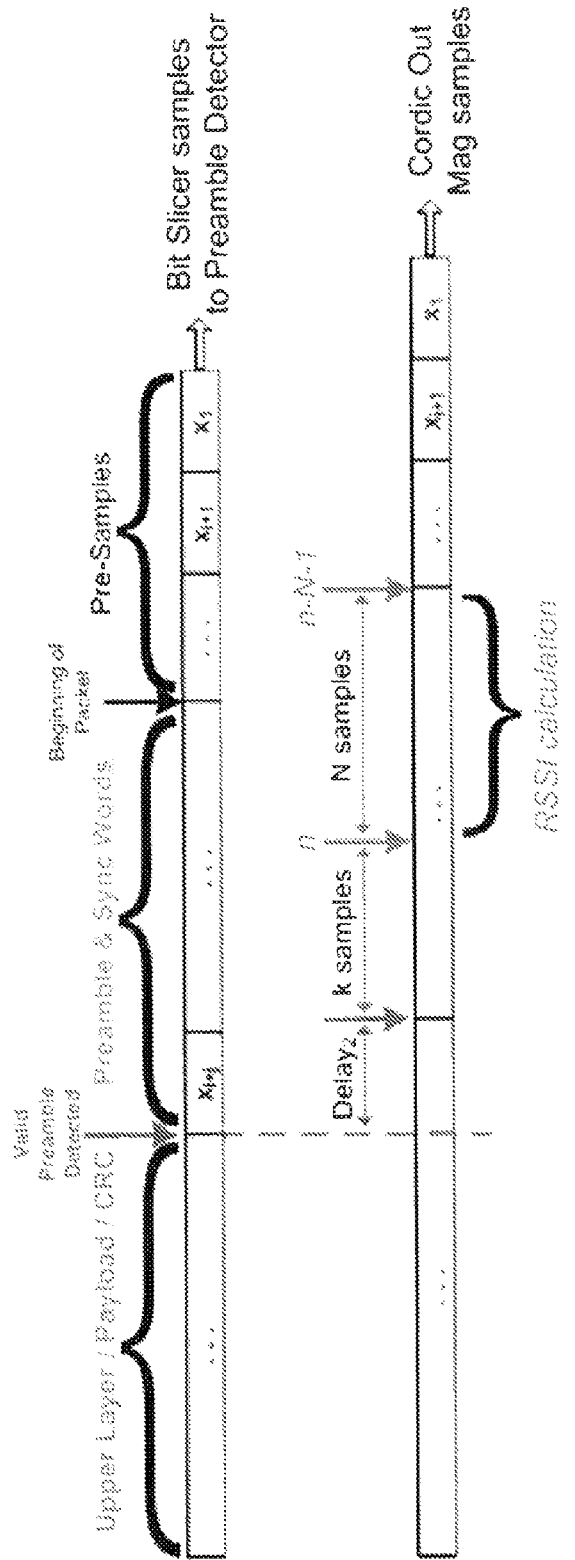
FIG. 20 is a diagram illustrating an example relationship between sample memory used for output of a bit slicer and magnitude data found in output of a CORDIC block.

FIG. 20 illustrates the relationship of Equation (17) to the sample memory for the output of the bit slicer and the magnitude data found on the output of the CORDIC block 1710. The channel power measurement may be calibrated to accommodate the gains/losses from the upstream processing, which may include the RF subassembly along with the digital receiver blocks. In an example where a CORDIC block 1734 is used downstream in the channel optimizer, this same block could easily be duplicated there and take advantage of the narrower occupied bandwidth (OBW) filter in the channel optimizer.

Channel Optimizer Block

The channel optimizer block 1706 may provide additional filtering to the incoming samples to remove more noise and interference. The channel optimizer block 1706 may accurately estimate and remove frequency error. Once the frequency error is removed (e.g., by operation of a frequency error estimator 1724 and complex mixer 1726), a narrow filter 1732 (e.g., an OBW filter) may be applied to the corrected signal. The corrected signal may be the fed into a CORDIC block 1734 and sent to the bit constructor block 1708. The CORDIC block 1734 found in the channel optimizer 1706 may serve the same purpose as the CORDIC block 1710 found in the correlator block 1704. Both convert I/Q samples into a $\Delta\theta$ and magnitude response.

Several delay blocks (e.g., delay 1730 and delay 1736) are required for signal alignment. The time delays may be derived using example Equation 18. An implementation may include delays implemented in the closest sample clock delay.

Delay$_3$=Delay$_1$+DelayAcFilter+DelayCordic

Delay$_4$=DelayFIR+DelayCordic2    Equation (18)

where,
Delay$_3$ (sec), delay to align the input of the channel optimizer to a valid detected preamble;
Delay$_4$ (sec), delay to align the input of the bit constructor block with a valid detected preamble;
Delay$_1$ (sec), delay block found in correlator block;
DelayAcFilter (sec), delay of the AC filter found in the correlator block;
DelayCordic2 (sec), delay of the CORDIC block found in the channel optimizer block;
DelayFIR (sec), delay of the FIR filter found in the channel optimizer block;

Once the correlator block 1704 has successfully detected a valid preamble, the bit constructor block 1708 may become active. Since the frequency error has been removed from the samples, there is no need to remove the DC. Therefore, the samples may be summed to determine bit values. The sample summer 1738 seen in the bit constructor 1708 may be configured to add the samples together to determine the logical value over a bit interval. Since the samples that occur at the bit transitions will include large transients that may contain erroneous information, these samples may be intentionally excluded in the summing operation. Therefore, the sample summer 1738 may operate on the center samples (of each bit) with the transition samples discarded. Once the relevant samples have been summed, the final bit interpretation is completed with a positive signal resulting in a '1' and negative signal resulting in a '0'.

Continuing to refer to the bit constructor 1708 of FIG. 17, as the sample summer 1738 completes the process of summing the bit, it sends the resulting 1 or 0 to a shift register 1740 (shown for purposes of example as a 16-bit register). This register will continue to shift in the detected bits until all 16 registers are full. Once this register 1740 is full, it dumps the 16-bit word into a circular first-in/first-out (FIFO) buffer.

The bit constructor 1708 sends output to a system interface 304 (as seen in FIG. 3), which may provide the interconnection between the internal operation of the FPGA 130 and the external DSP 134 (e.g., as seen in FIG. 1). The system interface 304 may contain the circular FIFO buffer, all memory mapping logic to decode the UART registers (if available), various control registers, and internal memory blocks accessible to the DSP. An example of these system elements is seen in FIGS. 1 and 3.

The circular FIFO buffer (e.g., located in the system interface 304 seen in FIG. 3) may contain 16-bit words that have accumulated from all of the channels in the multi-channel receiver. In addition, the FIFO may contain header information with each 16-bit word that is used by the DSP 134 for processing and aligning this word with the corresponding partial packets stored in the DSP memory. As the FIFO becomes full, interrupts are sent to the DSP 134 to read the data. Once the word has been successfully read, the circular FIFO is shifted to the next available word for reading, thereby freeing memory used by the previously read word. To minimize CPU overhead, and delay through the system, the interrupt may be programmable, in both the number of words before an interrupt occurs and the maximum amount of time where that data may remain in the FIFO with no interrupt.

Frequency Error Estimator Block

Figure 21:
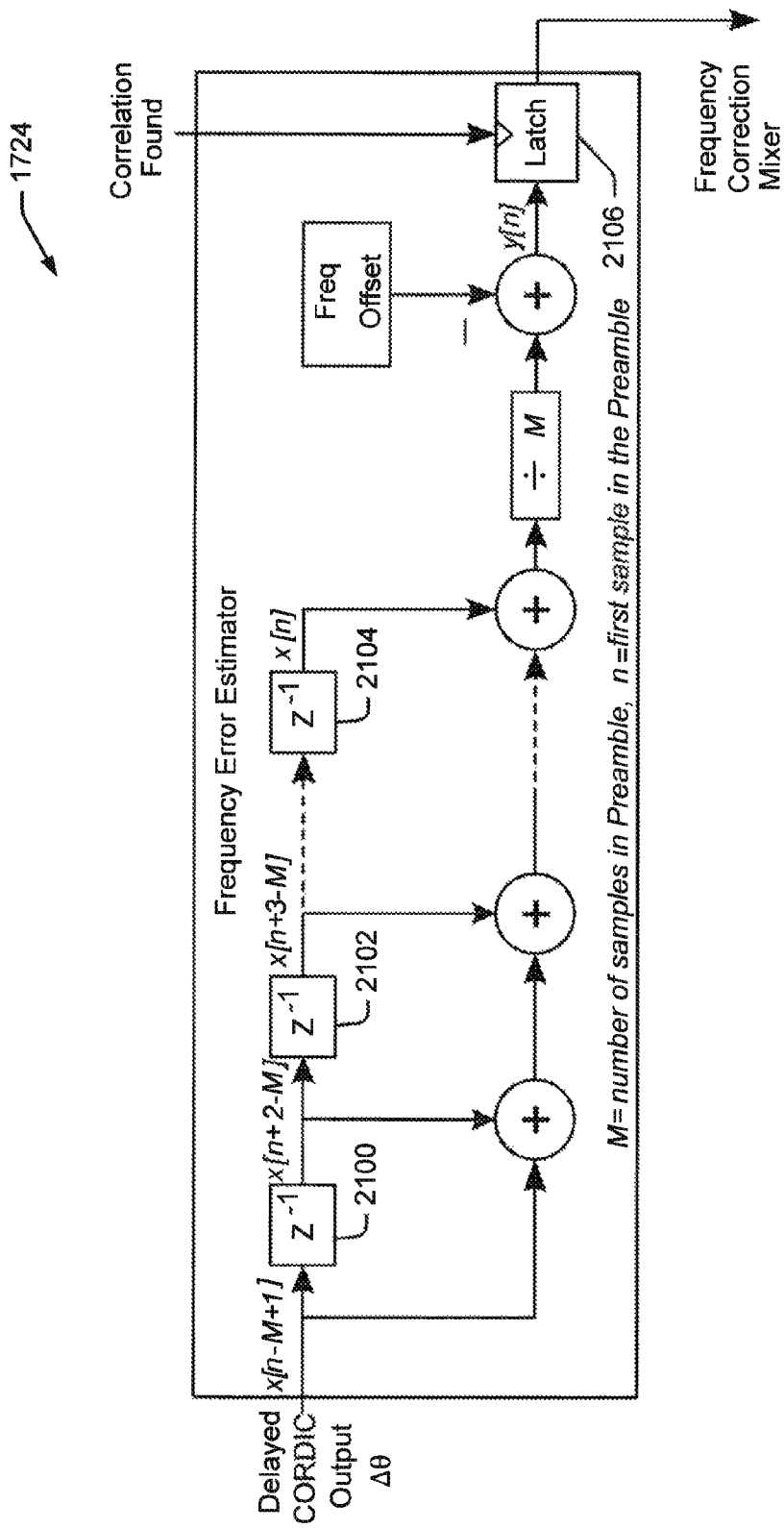
FIG. 21 is a block diagram showing detail of an example frequency error estimator.

FIG. 21 shows detail of an example frequency error estimator 1724, which was first seen as part of the channel optimizer 1706 of the decoder 1700 of FIG. 17. In the example of FIG. 21, the frequency error estimator 1724 may utilize a summation of terms 2100, 2102, 2104 which is performed. The summing process divides by "M," a number of samples in the preamble of a packet, and uses "n," a first sample in the preamble. The summing process ends when a correlation is found with a preamble. Upon correlation, a latch 2106 corresponds to an end of the calculation.

The frequency error estimator 1724 may measure rotational frequency error of samples. Once a positive preamble has been detected from the correlator block 1704, the frequency error is estimated over the full length of the preamble (e.g., over 32 bits). Since the preamble signature is known, the estimated frequency error can be determined by the frequency error estimator 1724. The estimated frequency error may immediately be applied to the correcting complex mixer 1726 (as shown in FIG. 17) for the remaining payload found in the packet. Depending on the signature of the preamble, there could be some expected frequency offset. This expected offset can simply be removed with subtraction in the last stage of this block. This will be the case when there is an unequal number of 1s and 0s found in the preamble. The frequency estimator 1724 can be efficiently implemented in the FPGA 130, e.g., in part by using adders and shifters, and using the example of Equation (19).

$$y[n] = \frac{x[n] + x[n-1] + \ldots + x[n-M-1]}{M} - freqOffset \quad \text{Equation (19)}$$
$$= \sum_{i=n}^{n-M-1} \frac{x[i]}{M} - freqOffset$$

$$n = peakCorrelation + \text{delay2} + k$$

where,
- y (sample), output of the frequency estimator;
- x (sample), incoming $\Delta\theta$ samples;
- k (samples), offset relative to the location of the "Peak Correlation"; for $\Delta\theta$ sample stream;
- M Total number of taps found in the frequency estimator; and
- freqOffset (radians), expected frequency offset found in the preamble signature.

Figure 22:
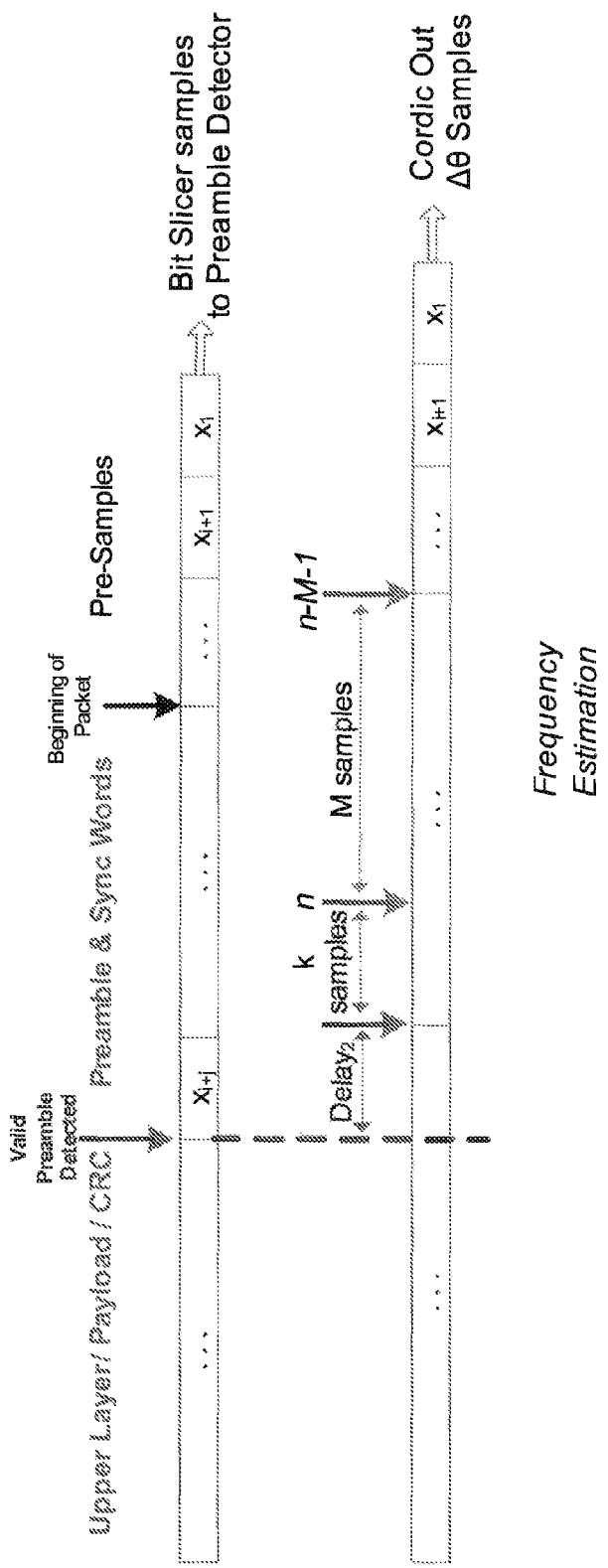
FIG. 22 is a diagram illustrating an example relationship between sample memory used for output of a bit slicer and output of a CORDIC block.

FIG. 22 illustrates the relationship of Equation 19 to the sample memory for the output of the bit slicer 1720 and the $\Delta\theta$ samples found on the output of the CORDIC block 1734.

The uncertainty of the frequency estimator block 1724 should be understood since the downstream FIR 1732 should accommodate this error. Using the entire preamble period may provide a sufficiently accurate estimate. However when receiving a signal that is operating at the sensitivity levels, the accuracy of the frequency estimator block 1724 will be degraded by the elevated noise floor (and/or interference). The goal is to have the uncertainty of the frequency estimator 1724 to be small relative to the occupied bandwidth (OBW) of the signal. This can easily be accomplished with the frequency estimator found in FIG. 21 along with a suitable preamble length.

Down-Sampler

Referring again to FIG. 17, there is an optional down-sampler or decimator 1728 that occurs prior to the complex mixer 1726. Since the IQ samples are typically heavily oversampled, the incoming samples may be down-sampled by simply throwing away samples. The most common down-sample rate is 2. This allows both I and Q data streams to utilize the same filter resources by overdriving the downstream OBW FIR 1732 clock by a factor of two, interleaving the I and Q data through the same taps.

Complex Mixer (42/52)

The complex mixer 1726 (seen in the channel optimizer 1706 of FIG. 17) may remove the frequency error that was determined in the frequency error estimator block 1724. This process may be performed using a complex mix, such as by multiplying the down sampled incoming I/Q samples by $e^{-j\omega nT}$, where $\omega$ is the radial frequency error that is estimated by the frequency estimator block 1724.

OBW FIR Filter

With the frequency error removed from the incoming I/Q samples, a narrower filter 1732 (shown in FIG. 17) can be applied. This filter 1732 may be based on the occupied bandwidth (OBW) of the incoming signal, and may include extra bandwidth to accommodate the error of the frequency estimator. In one example, the OBW filter for a GFSK system may be set to a bandwidth of 50 kHz. This example bandwidth was derived from the 98% OBW (47 kHz) of the GFSK signal along with an additional 3 kHz of bandwidth to account for the frequency estimator uncertainty. In the example, if a radio receiver has a bandwidth of 100 kHz, by applying the 50 kHz filter the bandwidth is reduced by one-half, and the sensitivity performance will improve by 3 dB.

CORDIC

The CORDIC block 1734 found in the channel optimizer 1706 serves a purpose similar to the CORDIC block 1710 found in the correlator block 1704. Both convert the I/Q samples into the $\Delta\theta$ and magnitude response.

Bit Constructor Block

Once the correlator 1704 has successfully detected a valid preamble, it enables the bit constructor block 1708 to become active.

Sample Summer

Because the frequency error was removed in the channel optimizer 1706, there is no need to remove a DC component. This allows for the simple summing of samples to determine the bit value.

The sample summer 1738 will add the samples together to determine the logical value over a bit interval. Since the samples that occur at the bit transitions will include large transients that contain erroneous information, they may be intentionally excluded in the summing operation. Therefore, the sample summer 1738 may operate on the center samples, and may discard transition samples. Once the relevant samples have been summed, the final bit interpretation is completed with a positive signal resulting in a '1' and negative signal resulting in a '0'.

16-Bit Shift Register

Once the sample summer 1738 completes summing the bit, it sends the resulting 1 or 0 to the 16-bit shift register 1740. The register 1740 will continue to shift in the detected bits until all 16 registers are full. Once the register is full, it dumps the 16-bit word into the circular FIFO buffer (e.g., output interface 328 of FIG. 3).

System Interface

The system interface 304 (see FIG. 3) provides the interconnection between the FPGA internal operation and the external DSP. It contains the circular FIFO buffer, all memory mapping logic to decode the UART registers (if available), various control registers, and internal memory blocks accessible to the DSP.

Circular FIFO Buffer

The circular FIFO buffer contains 16 bit words that have accumulated from all of the channels in the multi-channel receiver. In one example, the FIFO also contains header information with each 16-bit word that is used by the DSP for processing and aligning this word with the corresponding partial packets stored in the DSP memory. As the FIFO becomes full, interrupts are sent to the DSP processor to read the data. Once the word has been successfully read, the circular FIFO is shifted to the next available word for reading, along with freeing the memory of the previously read word. To minimize CPU overhead, and delay through the system, the interrupt is programmable, in both the number of words before an interrupt occurs and the maximum amount of time that data can be present in the FIFO without interrupt.

Example Frequency Misalignment Removal in FSK/MSK Decoder Operation

Figure 23:
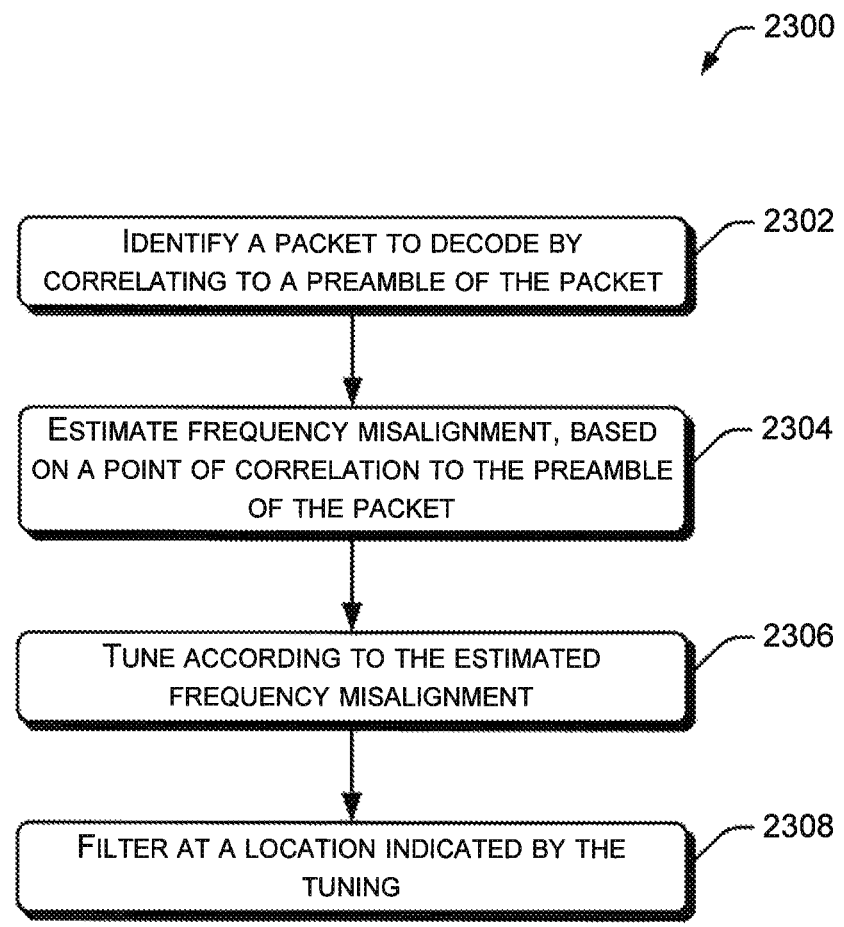
FIG. 23 is a flow diagram showing a first example operation of a multichannel radio that performs FSK/MSK decoding.

FIG. 23 is a flow diagram showing a second example operation of a multichannel radio that performs FSK/MSK decoding. At operation 2302, a packet is identified to decode by correlating to a preamble of the packet. The correlation may be performed by a correlator 1704 of the decoder 1700 of FIG. 17. At operation 2304, a frequency error and/or misalignment (e.g., between transmitter and receiver) is estimated. The estimate may be made based in part on a point of correlation to the preamble of the packet. At operation 2306, the receiver is tuned according to the estimated frequency misalignment. At operation 2308, a filter is located at the frequency indicated by the tuning. In one example, a filter of approximately the occupied bandwidth of the incoming signal is placed on the frequency of the incoming signal.

Radio to Detect and Compensate for Frequency Error

A multi-channel radio is configured to detect and compensate for frequency misalignment with endpoint transmitters. A transmitter of each endpoint may transmit an uplink signal with a frequency error, which may be due to low-cost construction and/or inaccuracies in a crystal or other component (s) used by the endpoint. This scenario is prevalent in unlicensed bands where there is no restriction on the frequency stability of the transmitter. The multi-channel radio estimates the frequency error of the received signal. If a response is required to the endpoint, then a downlink signal is transmitted back to the endpoint on the actual measured received frequency, rather than the frequency it was supposed to use. The estimation may be performed in real time with all supported endpoints, in part because each endpoint may have a different frequency error.

In one example, a frequency error estimator may be located in a decoder to determine the frequency error of a received signal. Accordingly, a large number of endpoints may transmit on frequencies that include an error. By adjusting a transmission frequency to include the error, transmissions to each endpoint may be made on a frequency expected by the endpoint. Accordingly, narrower receive filters may be used by each endpoint, and modulation protocols may be utilized that produce better link margin.

Figure 24:
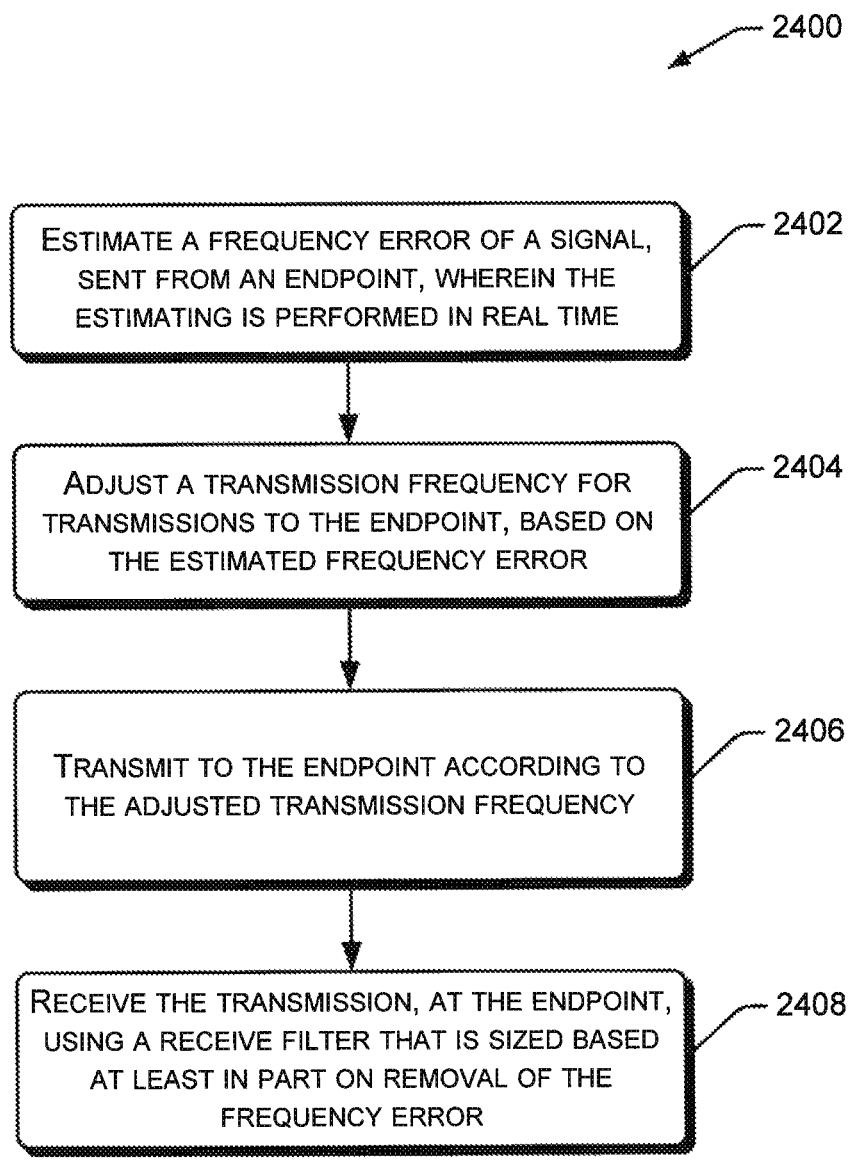
FIG. 24 is a flow diagram showing a second example operation of a multichannel radio that performs FSK/MSK decoding.

FIG. 24 is a flow diagram showing example operation 2400 of a radio that detects and compensates for frequency error. At operation 2402, a frequency error of a signal from an endpoint or other transmitter is estimated. The estimate may be done in real time (or near real time, e.g. during a period when transmission is allowed by the endpoint). In one example, a plurality of endpoints may transmit in rapid succession, and frequency error estimates for each endpoint may be rapidly calculated.

At operation 2404, a transmission frequency for use in communicating with the endpoint is adjusted based on the estimated error. In one example, the transmission frequency (from radio to endpoint) may be adjusted to a higher or lower frequency based on the estimated error of the endpoint's transmission to the radio.

At operation 2406, the radio transmits to the endpoint according to the adjusted transmission frequency. Because the transmission is received by the endpoint at a frequency expected by the endpoint (i.e., a frequency that compensates for the error of the endpoint) the endpoint may be more likely to successfully decode the transmission.

At operation 2408, the transmission is received at the endpoint. The transmission may be received using a narrower receive filter than would be possible without the adjusting operation 2404. This is true in part because the transmission is more precisely targeted to the expectations of the endpoint.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A radio receiver, comprising:
 a radio frequency (RF) subsystem;
 an analog to digital converter to receive input from the RF subsystem and to digitize a spectrum; and
 a digital subsystem configured to:
  process the digitized spectrum into data according to at least two channel plans;
  receive data from a plurality of overlapping filters associated with a plurality of channels of the at least two channel plans, wherein the plurality of overlapping filters is distributed over frequency spectrum based at least in part on possible frequency error of the incoming signal; and
  simultaneously decode at least some of the received data of the at least two channel plans according to at least two modulation schemes.

2. The radio receiver as recited in claim 1, wherein the at least two channel plans overlap a portion of the spectrum.

3. The radio receiver as recited in claim 1, wherein a modulation scheme from among the at least two modulation schemes rejects signals of another modulation scheme from among the at least two modulation schemes.

4. The radio receiver as recited in claim 1, wherein the at least two modulation schemes comprise a Gaussian minimum-shift keying/Gaussian frequency-shift key (GMSK/GFSK) modulation and an advanced modulation scheme.

5. The radio receiver as recited in claim 1, wherein channel plans differ due to channel bandwidths.

6. The radio receiver as recited in claim 1, wherein channel plans have different channel spacing.

7. The radio receiver as recited in claim 1, wherein the digital subsystem comprises:
 a decoder bank configured to simultaneously decode the at least two modulation schemes associated with the at least two channel plans, wherein the at least two channel plans differ in channel bandwidth, channel number, channel location and/or channel spacing.

8. The radio receiver as recited in claim 1, wherein the digital subsystem is defined at least in part in a field programmable gate array (FPGA).

9. The radio receiver as recited in claim 1, wherein the digital subsystem is defined at least in part in a digital signal processor (DSP).

10. The radio receiver as recited in claim 1, wherein the digital subsystem is defined at least in part in a logic device.

11. A digital subsystem, comprising:
a channelizer bank to divide a digitized spectrum into at least two channel plans; and
a decoder bank comprising at least two decoders to:
receive data from a plurality of overlapping filters associated with each of a plurality of channels of the at least two channel plans; wherein each of the plurality of overlapping filters is sized and positioned to overlap one or more adjacent filters by an amount that is based at least in part on an occupied bandwidth of and incoming signal; and
simultaneously decode at least some of the received data using the at least two decoders to decode at least two modulation schemes, respectively, wherein the at least two modulation schemes are utilized by the at least two channel plans.

12. The digital subsystem as recited in claim 11, wherein: the two modulation schemes include a Gaussian minimum-shift keying/Gaussian frequency-shift key (GMSK/GFSK) modulation and an advanced modulation scheme characterized in that it rejects data associated with the GMSK/GFSK modulation.

13. The digital subsystem as recited in claim 11, wherein the channelizer bank is configured to:
construct channel plans that have different channel bandwidths, channel locations, channel number and/or channel spacings.

14. The digital subsystem as recited in claim 11, wherein the digital subsystem is configured to position channels or select modulation types based in part on interference present at locations in the digitized spectrum.

15. The digital subsystem as recited in claim 11, wherein the digital subsystem utilizes channels having bandwidths found in advanced modulation schemes simultaneously with channels having narrower bandwidths of other modulation schemes.

16. A radio receiver comprising the digital subsystem as recited in claim 11, the radio receiver additionally comprising:
a radio frequency (RF) subsystem; and
an analog to digital converter to receive input from the RF subsystem and to form the digitized spectrum.

17. A method of utilizing dissimilar modulation schemes in radio frequency (RF) communication, comprising:
sampling a radio frequency (RF) spectrum to create a digitized spectrum;
utilizing at least two overlapping channel plans within the digitized spectrum; and
decoding at least two different modulation schemes, used on the at least two overlapping channel plans, wherein:
a channel plan uses a modulation scheme that rejects signals of a modulation scheme used by an overlapping channel plan;
the channel plan includes at least one channel, the at least one channel comprising a plurality of overlapping filters, wherein each of the plurality of overlapping filters is sized and positioned to overlap one or more adjacent filters by an amount that is based at least in part on an occupied bandwidth of an incoming signal; and
the decoding of the at least two different modulation schemes is performed simultaneously.

18. The method as recited in claim 17, wherein bandwidths of channels in one channel plan, from among the at least two overlapping channel plans, are different from bandwidths of channels in another channel plan, from among the at least two overlapping channel plans.

19. The method as recited in claim 17, wherein spacing of channels in one channel plan, from among the at least two overlapping channel plans, is different from spacing of channels in another channel plan, from among the at least two overlapping channel plans.

20. The method as recited in claim 17, wherein locations of channels in one channel plan, from among the at least two overlapping channel plans, are different from locations of channels in another channel plan, from among the at least two overlapping channel plans.

* * * * *